(12) United States Patent
Hansen

(10) Patent No.: US 6,528,989 B1
(45) Date of Patent: Mar. 4, 2003

(54) AC MAGNETIC TRACKER FOR OPERATION CLOSE TO METALLIC OBJECTS

(75) Inventor: Per Krogh Hansen, Colchester, VT (US)

(73) Assignee: Skysense, Ltd., VT (US)

( * ) Notice: Subject to any disclaimer, the term of this patent is extended or adjusted under 35 U.S.C. 154(b) by 0 days.

(21) Appl. No.: 09/532,825

(22) Filed: Mar. 21, 2000

(51) Int. Cl.⁷ .......................... G01B 7/00; G01R 33/025
(52) U.S. Cl. ........................... 324/207.12; 324/207.17; 702/150
(58) Field of Search ................ 324/207.12, 207.15, 324/207.16, 207.17, 225, 226, 234, 239, 240; 702/150–153; 342/450, 451, 453

(56) References Cited

U.S. PATENT DOCUMENTS

| | | | | |
|---|---|---|---|---|
| 4,394,831 A | * | 7/1983 | Egli et al. | 89/41.19 |
| 4,401,986 A | * | 8/1983 | Trenkler et al. | 340/870.32 |
| 4,628,265 A | * | 12/1986 | Johnson et al. | 324/329 |
| 4,849,692 A | * | 7/1989 | Blood | 324/208 |
| 5,168,222 A | * | 12/1992 | Volsin et al. | 324/207.17 |
| 5,453,686 A | * | 9/1995 | Anderson | 324/207.17 |
| 5,767,669 A | * | 6/1998 | Hansen et al. | 324/207.12 |
| 6,172,499 B1 | * | 1/2001 | Ashe | 324/207.12 |

\* cited by examiner

*Primary Examiner*—Edward Lefkowitz
*Assistant Examiner*—Reena Aurora
(74) *Attorney, Agent, or Firm*—H. Jay Spiegel

(57) ABSTRACT

Embodiments of an AC magnetic tracker include frequency-based compensation for metal distortion. The tracker measures the position and orientation of the receiver relative to the transmitter in up to six dimensions, position (x, y, z) and orientation (azimuth, elevation, roll). In some embodiments, magnetic fields are transmitted at selected frequencies and the received magnetic fields are measured in-phase with the transmitted magnetic field. In other embodiments, magnetic fields are transmitted at selected frequencies and the received magnetic fields are measured both in-phase and in-quadrature with the transmitted magnetic field. In yet other embodiments, a transition signal is transmitted and the received decaying signal is measured. Other embodiments disclose some combination of these features. The metal's inductive limit, decay time constant and polarity sign are calculated from the received signals. The present invention determines if the metals are conductive or ferrous and compensates for the metal distortion accordingly. The present invention contemplates a scheme allowing compensation for distortions commonly occurring when conductive and ferrous metals are adjacent a measuring space and, thus, overcomes the negative effects of metal distortion caused by such adjacency of such metals.

37 Claims, 21 Drawing Sheets

Transmitter current

Primary field at receiver

Primary emf in receiver $\varepsilon^{(p)}(t)$

Secondary field at receiver

Secondary emf in receiver

AC MAGNETIC TRACKER FOR OPERATION CLOSE TO METALLIC OBJECTS

BACKGROUND OF THE INVENTION

The present invention relates to embodiments of an AC magnetic tracker with frequency-based compensation for distortion caused by metals.

As is well known, eddy currents are induced in conductive metals through the presence of changing magnetic fields. This is a particularly serious problem where AC current is used since where the AC current is operating at any frequency, eddy currents are induced in nearby conductive metals throughout each measurement period.

In systems using magnetic fields to measure position and orientation of objects in a prescribed space in six degrees of freedom, some have attempted to solve some of the problems inherent in AC-based devices by devising systems that use direct current (DC). In such systems, eddy currents are still induced by the rising and falling edges of the DC magnetic pulse. However, delaying of field measurements until sometime after the rising edge allows eddy currents to decay significantly and for measurements to be taken that are substantially free of eddy current distortions. However, use of DC-based systems increases the length of time expended in conducting each cycle of measurements.

Systems have been devised in which the environment in and adjacent the measuring space is "mapped" so that the locations of metallic objects are known as is their effect on magnetic measurements. A look-up table is provided to store these measurements so that compensation may be made for prospective eddy current distortion. Such a method is quite tedious and is only effective if the environment in and around the measuring space stays the same at all times, that is, no metallic object or objects are moved from their original locations of placement and no such objects are moved adjacent the measuring space at any other time. In addition, such measurements depend upon a particular defined location for the transmitter coils. Movement of any objects and/or the transmitter coils requires re-measuring and mapping of the environment.

Ferrous objects (with a relative permeability $\mu_r > 1$), when placed in a magnetic field, acquire magnetization that is referred to as induced magnetization. The magnitude and direction of the induced magnetization is a function of the primary field strength, ferromagnetic susceptibility of the body, its shape, and its orientation with respect to the primary field. Ferrous objects may also have permanent or intrinsic magnetization, usually called remnant magnetization. Remnant magnetization is a function of metallurgical properties of the object as well as its thermal, mechanical, and geomagnetic history. Remnant magnetization can be very difficult to model since its strength and direction are often unknown for an individual object. No prior art system teaches compensation for distortion caused by ferrous metals.

As such, a need has developed for a position measuring system that can accurately measure the position and orientation of objects in a measuring space in the six degrees of freedom x, y, z, azimuth, elevation and roll, and which can do so regardless of the particular locations of metallic objects in and adjacent the measuring space. A need has also developed for such a system which can operate quickly without the need to wait for eddy current distortion to decay and wherein the system is less sensitive to ferrous metals, magnetic materials, dynamic filtering and environmental noise.

The following prior art is known to Applicant:

U.S. Pat. Nos. 4,346,384 and 4,328,548 and 4,314,251 and 4,298,874 and 4,054,881 and 4,017,858 and 3,983,474 and 3,868,565 all teach the use of AC magnetic fields in order to measure the position and orientation of a sensor. These patents teach use of different algorithms including 1) Nutating vectors, 2) Far-field, 3) Near-field, 4) Iterative solutions, and 4) Direct solutions.

Some of the patents teach the use of mapping the environment, that is, before the position and orientation measurements are made, storing the mapping data in memory and using look-up tables in order to compensate for eddy current distortion caused by metals in the environment during position and orientation measurements. No direct compensation for the metallic distortions, during position and orientation measurements, are made.

U.S. Pat. Nos. 4,287,809 and 4,394,831 teach position and orientation systems utilizing AC magnetic fields. They utilize non-coplanar transmitter coils and non-coplanar receiver coils. They teach mapping of the environment before the position and orientation measurements are made, storing the mapping data in memory and the use of look-up tables in order to compensate for eddy current distortion for metals in the environment during position and orientation measurements. No direct compensation for the metallic distortions is made during position and orientation measurements.

U.S. Pat. No. 4,829,250 teaches the use of multifrequency transmitters in a position and orientation system. The system utilizes AC magnetic fields and curvefitting is used in order to compensate for the eddy current distortion in conductive metals. The eddy current distortion of conductive metals varies as a function of the frequency and the conductivity. The eddy current distortion decreases with lower frequencies and is zero for DC fields. This method works well if only one conductive metal is present in the work area. If multiple conductive metals are present in the work area, problems may arise. If ferrous metals are present in the work area, a serious problem arises, since the magnetic distortion from ferrous metals is a function of the permeability and the frequency. This distortion decreases with higher frequencies directly opposite the eddy current distortion for conductive metals. The metallic distortion for ferrous metals is not equal to zero at DC. This means that the system will not compensate for metallic distortion if ferrous metals are present. No compensation is made for ferrous metallic distortion.

U.S. Pat. No. 5,347,289 teaches the use of a rotating multifrequency AC magnetic field in a position and orientation system. The system utilizes a special timing sequence of the rotating field in order to compensate for the eddy current distortion from conductive metals. The eddy current distortion decreases with lower frequencies and is zero for DC fields. This method works well if only one conductive metal is present in the work area. If multiple conductive metals are present in the work area, problems may arise. If ferrous metals are present in the work area, a serious problem arises, since the magnetic distortion from ferrous metals is a function of the permeability and the frequency. This distortion decreases with higher frequencies directly opposite with respect to the eddy current distortion for conductive metals. The metallic distortion for ferrous metals is not equal to zero at DC. This means that the system will not compensate for metallic distortion if ferrous metals are present. No compensation is made for ferrous metallic distortion.

U.S. Pat. Nos. 5,694,041 and 5,457,641 teach the use of AC magnetic fields in a position and orientation system.

These patents teach the need for an initial mapping of the environment and storing of this data into memory. The data is then used to correct the position and orientation measured during operation. No direct compensation is made for the conductive and ferrous metal distortion.

U.S. Pat. Nos. 5,646,524 and 5,646,525 teach the use of AC magnetic fields in a position and orientation system. They utilize a rotating magnetic field and teach the use of mapping the environment before the position and orientation measurements are made, storing the mapping data in memory, and the use of look-up tables in order to compensate for eddy current distortion for metals in the environment during position and orientation measurements. No direct compensation of the metallic distortions is made during position and orientation measurements.

In U.S. Pat. Nos. 4,849,692 and 4,945,305, a remote object's position and orientation are determined. These systems utilize a plurality of pulsed DC magnetic fields with steady state components. The steady state components of the generated magnetic fields are measured by DC-field sensitive sensors. These systems reduce the field distortions resulting from the decay of the eddy currents induced in electrically conductive materials by magnetic fields. These systems wait a long enough time for the eddy currents to decay to a sufficiently small value before measuring the steady state component of the generated magnetic fields. These patents teach the need for generating magnetic fields with a steady state component. They further teach the need for using a complex, bulky and expensive active DC-field sensitive sensor. They yet further teach the need for compensation for the Earth's magnetic field by measuring it when no magnetic field is being generated. This is not an AC magnetic field system. The patents compensate for some conductive metal distortions. Problems do exist with the Earth's magnetic field, ferrous metallic distortions and environmental noise.

In U.S. Pat. No. 5,453,686, a remote object's position and orientation are determined. The system utilizes a plurality of pulsed DC magnetic fields with steady state components. The steady state components of the generated magnetic fields are measured by passive sensors. The system reduces the field distortions resulting from the decay of eddy currents induced in electrically conductive materials by magnetic fields. The system waits enough time for the eddy currents to decay before measuring the steady state component of the generated magnetic fields. This patent teaches the need for generating pulsed DC magnetic fields with a steady state component, and the need for using a single coil with an integrator and a reset switch in order to sense the generated pulsed DC magnetic fields. This patent yet further teaches the need for compensation for movements in the Earth's magnetic field and offsets in the preamplifiers and integrators by measuring the sensors' output while no magnetic field is being generated. This is not an AC magnetic field system, and does compensate for some conductive metal distortions. Problems with ferrous metallic distortions and environmental noise are not solved.

In U.S. Pat. No. 5,767,669, magnetic pulses are used in order to compensate for the eddy current distortion for a magnetic position and orientation system. Some embodiments teach the use of pulses with a steady state component and some embodiments teach the use of pulses without any steady state components. The systems utilize passive sensors and are an improvement on the pulsed DC systems taught in U.S. Pat. Nos. 4,849,692; 4,945,305; and 5,453,686, but one still needs to wait at least one metal decay time in each pulse in order to compensate for the conductive metal distortion. This is not an AC magnetic field system and, although the systems compensate for some conductive metal distortions, problems do exist with ferrous metallic distortions and environmental noise.

The use of DC pulses severely limits the dynamic performance of the system disclosed in U.S. Pat. No. 5,767,669 and makes it difficult to operate inside a building due to poor filtering of 50/60 Hz current and monitor noise. The DC magnetic systems have serious problems with magnetized ferrous metals (magnetic materials) in the work area due to the measurements of DC magnetic fields and the Earth's magnetic field. Problems exist in DC magnetic field systems with conductive metals with longer decay times since the pulse must be longer in order to accommodate the longer decay time. This causes more time skew in the measurements, more problems with filtering, and very slow measurement rates, and therefore poor dynamic performance. No prior art DC systems teach any compensation method for ferrous metal distortion as taught herein.

SUMMARY OF THE INVENTION

The present invention relates to embodiments of AC magnetic trackers with frequency-based compensation for distortion caused by metals. The present invention is disclosed in eight embodiments. Each of the embodiments utilizes AC magnetic fields to determine position and orientation in the six degrees of freedom (x, y, z) and azimuth (az), elevation (el) and roll (rl). Each of these embodiments utilizes the theory, knowledge of metals, and calculations developed for magnetic geophysical prospecting such as described in Grant et al. "Interpretation of Applied Geophysics", New York McGraw-Hill 1965, and for metal detectors for the selection of transmission frequencies for the magnetic fields and methods of compensation. The eight embodiments are briefly described as follows:

(1) The first embodiment of the present invention includes at least one AC magnetic transmitter and at least one magnetic receiver. The system transmits at a frequency, $f_1$, low enough for the conductive metals with the highest conductivity to have an in-phase signal approximately equal to zero. The system is capable of measuring the received signal in-phase with the transmitted signal and stores the received signal generated at $f_1$, this signal being free of any eddy current distortion and therefore free of any conductive metal distortion. The system calculates the position (x, y, z) and the orientation (az, el, rl) of the receiver relative to the transmitter based on signals free from distortion from metals.

(2) The second embodiment includes at least one AC magnetic transmitter and at least one magnetic receiver. The system transmits at least two frequencies, $f_{11}$ and $f_{12}$, low enough so that no metals have reached their inductive limit. The system is capable of measuring the received signal for each of these frequencies in-phase and in-quadrature to the transmitted signal, $I_{11}$, $Q_{11}$ and $I_{12}$, $Q_{12}$. The system calculates the metal distortion free signal from the four received signals, and calculates the position (x, y, z) and the orientation (az, el, rl) of the receiver relative to the transmitter based on signals free from distortion from metals.

(3) The third embodiment of the present invention includes at least one AC magnetic transmitter and at least one magnetic receiver with the system transmitting at a frequency, $f_0$, at which distortion from ferrous metals is zero for the in-phase signal. This frequency is found from a frequency graph of ferrous metals and/or knowledge as to the size, shape, conductivity and permeability of the metal.

The system is capable of measuring the received signal in-phase with the transmitted signal with the received signal generated at $f_0$, being free of any ferrous metal distortion. The system calculates the position (x, y, z) and the orientation (az, el, rl) of the receiver relative to the transmitter based upon signals free from distortion from ferrous metals.

(4) The fourth embodiment of the present invention includes at least one AC magnetic transmitter and at least one magnetic receiver, with the system transmitting at a frequency, $f_h$, at which distortion from the ferrous metal has reached the inductive limit. The system further transmits at a frequency, $f_1$, where the in-phase signal is approximately equal to zero. The system is capable of measuring the received signal in-phase with the transmitted signal. The signal at $f_h$, free from ferrous metal distortion, is determined from the two in-phase received signals. The system calculates the position (x, y, z) and the orientation (az, el, rl) of the receiver relative to the transmitter based upon signals free from distortion from ferrous metals.

(5) The fifth embodiment of the present invention includes at least one AC magnetic transmitter and at least one magnetic receiver, the system transmitting at a frequency, $f_h$, high enough for both the conductive and the ferrous metals in the environment to have reached their inductive limit. The system stores the received signal generated at $f_h$ and then transmits a transition signal in which the transmission transition is made from the maximum level to the zero level in a prescribed short time. The system measures the metal's inductive limit by measuring the received magnetic field right after the transition. The inductive limit found from the transition signal is either added to or subtracted from the signal received at $f_h$ in order to determine the received signal free of metal distortion from conductive as well as ferrous metals. If a second measurement of the received transition signal is higher than the first measurement, the inductive limit is added, and if a second measurement of the received transition signal is smaller than the first measurement, the inductive limit is subtracted. The system calculates the position (x, y, z) and the orientation (az, el, rl) of the receiver relative to the transmitter based upon signals free from distortion from conductive and ferrous metals.

A number of variations to the fifth embodiment are contemplated since it may not be practical to utilize as high a frequency as the needed frequency $f_h$.

(5a) The first variation of the fifth embodiment is to utilize a frequency as practical $f_{hp}$ and calculating the expected quadrature signal if the metal was purely conductive using the decay constant T and the inductive limit found from the transition signal. If the calculated quadrature $Q_c$ (if $f_{hp=fT}$, then $Q_c=\frac{1}{2}$ inductive limit) is equal to the measured quadrature signal $Q_{hp}$ at $f_{hp}$, then the metal is purely conductive and the signal free of metal distortion can be found from $I=I_{hp}-+kQ_c$ where k is found from the frequency and the decay constant (if $f_{hp}=f_T$, then k=2). If $Q_c$ is not equal to $Q_{hp}$, then the metal is ferrous and the signal free from distortion is found from:

A) Transmitting at a low enough frequency $f_1$ where the in-phase signal of the metal is approximately equal to the value at DC. The signal free of metal distortion can then be found from the signal at $f_1$ and the inductive limit as $I=I_1+-2*$ (inductive limit); or B) Transmission of an additional frequency, between $f_T$ and $f_{hp}$, $f_n$, and then using curve fitting on the quadrature signals $Q_n$ and $Q_{hp}$ in order to find frequency $f_h$ where the $Q_h=0$. It is then possible to find $I_h$ which is the received signal when both the conductive and ferrous metal have reached the inductive limit. The signal free of metal distortion is then found from $I=I_h+-$inductive limit.

(5b) The second variation of the fifth embodiment is to utilize a frequency $f_0$, which is found from the decay time constant as $f_0=k_0*1/T$, where $k_0$ is determined from the permeability of the metal. Then calculating the expected quadrature signal if the metal was purely conductive using the decay constant T and the inductive limit found from the transition signal. If the calculated quadrature $Q_c$ signal is equal to the measured quadrature signal $Q_0$ at $f_0$, then the metal is purely conductive and the signal free of metal distortion can be found from $I=I_0-+kQ_c$ where k is found from the frequency and the decay constant. If $Q_c$ is not equal to $Q_0$, then the metal is ferrous and the signal free from distortion is $I=I_0$, since $f_0$ is the frequency where the in-phase signal of the ferrous metal is equal to zero.

(6) The sixth embodiment of the present invention includes at least one AC magnetic transmitter and at least one magnetic receiver, the system transmitting at a frequency, $f_h$, high enough for both the conductive and the ferrous metals in the environment to have reached their inductive limit. The system stores the received signal generated at $f_h$, and then transmits a transition signal where the transmission transition is made from the maximum level to the zero level in a predetermined short time. The system measures the metal's inductive limit by measuring the received magnetic field right after the transition, with the inductive limit found from the received transition signal being either added or subtracted from the signal received at $f_h$ in order to determine the received signal free of metal distortion from conductive as well as ferrous metals. If a second measurement of the received transition signal is higher than the first measurement, the inductive limit is added, or if a second measurement of the received transition signal is smaller than the first measurement, the inductive limit is subtracted. The system further includes means to determine a decay time constant of the received transition signal and further means to transmit an AC signal at approximately $f=1/T$. The system is capable of measuring the received signal in-quadrature to the transmitted signal, $Q_T$, and the new inductive limit can be found from this AC signal, thus allowing the system to avoid using the transition signal from time to time. The system calculates the position (x, y, z) and the orientation (az, el, rl) of the receiver relative to the transmitter based on signals free from distortion from conductive and ferrous metals.

(7) The seventh embodiment of the present invention includes at least one AC magnetic transmitter and at least one magnetic receiver. The system transmits at a frequency, $f_h$, high enough for both the conductive and the ferrous metals in the environment to have reached their inductive limit. The system stores the received signal generated at $f_h$, and then transmits a transition signal where the transmission transition is made from the maximum level to the zero level in a predetermined short time. The system measures the metal's inductive limit by measuring the received magnetic field right after the transition. The inductive limit found from the transition signal is either added or subtracted from the signal received at $f_h$ in order to determine the received signal free of metal distortion from conductive as well as ferrous metals. If a second measurement of the received transition signal is higher than the first measurement, the inductive limit is added or if a second measurement of the received transition signal is smaller than the first measurement, the inductive limit is subtracted. The system further includes means for finding the decay time constant of the received transition signal and further means to transmit a second AC signal at approximately f=1/T and a third AC signal at approximately f=k*1/T. The system is capable of measuring the received signal for each of these frequencies in quadrature to the transmitted signal, $Q_T$ and $Q_{kT}$. The new inductive limit can be found from these two AC signals, thus allowing the system to avoid using the transition signal from time to time. If $Q_T(t)/Q_{kT}(t)=Q_T(0)/Q_{kT}(0)$, then the transition signal is not used, otherwise, the transition signal is used. The system calculates the position (x, y, z) and the orientation (az, el, rl) of the receiver relative to the transmitter based on signals free from distortion from conductive and ferrous metals.

(8) The eighth embodiment of the present invention includes at least one AC magnetic transmitter and at least one magnetic receiver. The system transmits at a frequency, $f_h$, high enough for both the conductive and the ferrous metals in the environment to have reached their inductive limit. The system stores the received signal generated at $f_h$, and further includes means for transmitting a second AC signal at $f_{11}$, and a third AC signal at $f_{12}$, both $f_{11}$ and $f_{12}$ being lower than $f_h$. The system is capable of measuring the received signal for each of these frequencies in-phase and in-quadrature to the transmitted signal, $I_{11}$, $Q_{11}$ and $I_{12}$, $Q_{12}$. The system calculates the inductive limit for the metals from the four received signals. The inductive limit is either added to or subtracted from the signal received at $f_h$ in order to determine the received signal free of metal distortion from conductive as well as ferrous metals. If $I_{12}>I_{11}$, the inductive limit is added, and if $I_{12}<I_{11}$, the inductive limit is subtracted. The system calculates the position (x, y, z) and the orientation (az, el, rl) of the receiver relative to the transmitter based upon signals free from distortion from conductive and ferrous metals.

A number of variations to the eighth embodiment are made since it may not be practical to utilize as high a frequency as the needed frequency $f_h$.

(8a) The first variation of the eighth embodiment is to utilize a frequency as practical $f_{hp}$ and calculating the expected quadrature signal if the metal was purely conductive using the decay constant T and the inductive limit found from $I_{11}$, $Q_{11}$, $I_{12}$ and $Q_{12}$. If the calculated quadrature $Q_c$ (if $f_{hp}=f_T$, then $Q_c=\frac{1}{2}$ inductive limit) is equal to the measured quadrature signal $Q_{hp}$ at $f_{hp}$, then the metal is purely conductive and the signal free of metal distortion can be found from $I=I_{hp}-+kQ_c$ where k is found from the frequency and the decay constant (if $f_{hp}=f_T$, then k=2). If $Q_c$ is not equal to $Q_{hp}$, then the metal is ferrous and the signal free from distortion is found from:
  A) Transmitting at a low enough frequency $f_1$ where the in-phase signal of the metal is approximately equal to the value at DC. The signal free of metal distortion can then be found from the signal at $f_1$ and the inductive limit as $I=I_1+-2*$ (inductive limit); or
  B) Transmission of an additional frequency, between $f_T$ and $f_{hp}$, $f_n$, and then using curve fitting on the quadrature signals $Q_n$ and $Q_{hp}$ in order to find frequency $f_h$ where the $Q_h=0$. It is then possible to find $I_h$ which is the received signal when both the conductive and ferrous metal have reached the inductive limit. The signal free of metal distortion is then found from $I=I_h+-$inductive limit.

(8b) The second variation of the eighth embodiment is to utilize a frequency $f_0$, which is found from the decay time constant as $f_0=k_0*1/T$, where $k_0$ is determined from the permeability of the metal. Then the expected quadrature signal is calculated if the metal was purely conductive using the decay constant T and the inductive limit found from $I_{11}$, $Q_{11}$, $I_{12}$ and $Q_{12}$. If the calculated quadrature $Q_c$ signal is equal to the measured quadrature signal $Q_0$ at $f_0$, then the metal is purely conductive and the signal free of metal distortion can be found from $I=I_0-+kQ_c$ where k is found from the frequency and the decay constant. If $Q_c$ is not equal to $Q_0$, then the metal is ferrous and the signal free from distortion is $I=I_0$, since $f_0$ is the frequency where the in-phase signal of the ferrous metal is equal to zero.

Each of the eight embodiments and their variants may be used for any kind of magnetic field position and orientation system, from systems measuring with only one degree of freedom, range r, to a system measuring with six degrees of freedom, position (x, y, z) and orientation (az, el, rl) and any systems measuring with any degrees of freedom between one and six. It can be used in systems using large, flat-in-plane, concentric, non-concentric, co-planar, or non-coplanar transmitter antennas and in systems with any size, concentric, non-concentric, single axis, multi-axis or co-planar or non-coplanar receiving antennas. The system can be used in systems using the relevant formulas for the magnetic field at any distance from the transmitter.

Accordingly, it is a first object of the present invention to provide embodiments of an AC magnetic tracker with frequency-based compensation for eddy current distortion.

It is a further object of the present invention to provide such systems including at least one AC magnetic transmitter and at least one magnetic receiver.

It is a still further object of the present invention to provide such system embodiments in which AC magnetic transmitter means transmits magnetic fields at a frequency low enough for the conductive metals with the highest conductivity to have an in-phase signal approximately equal to zero.

It is a yet further object of the present invention to provide such systems in which two low frequencies, selected so that the metals have not yet reached their inductive limit, are transmitted.

It is a yet further object of the present invention to provide embodiments of an AC magnetic tracker with frequency-based compensation for ferrous metal distortion.

It is a still further object of the present invention to provide such systems in which the AC magnetic transmitter means transmits magnetic fields at a frequency where ferrous metals in the environment in-phase signal are approximately equal to zero.

It is a still further object of the present invention to provide such systems in which the AC magnetic transmitter means transmits magnetic fields at a frequency high enough such that ferrous metals in the environment have reached their inductive limit and at a frequency low enough for the metal's in-phase signal to be approximately equal to the DC level.

It is a yet further object of the present invention to provide embodiments of an AC magnetic tracker with frequency-based compensation for both conductive and ferrous metal distortion.

It is a still further object of the present invention to provide such systems in which the AC magnetic transmitter means transmits magnetic fields at a frequency high enough such that both conductive and ferrous metals in the environment have reached their inductive limit and a transition signal from which the metal's inductive limit and decay time constant can be found.

It is a still further object of the present invention to provide such systems in which the AC magnetic transmitter means transmits magnetic fields at a frequency high enough such that both conductive and ferrous metals in the environment have reached their inductive limit and additional means to transmit at two additional frequencies low enough for the metal's inductive limit to not have been reached, from which the metal's inductive limit and decay time constant can be found.

It is a still further object of the present invention to provide such systems in which the transition signal does not have to be used from time to time.

It is a still further object of the present invention to provide such systems in which the need for transmission at a frequency high enough for both the conductive and the ferrous metals have reached their inductive limits has been replaced with a need for transmission of a lower frequency.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

Figure 1:
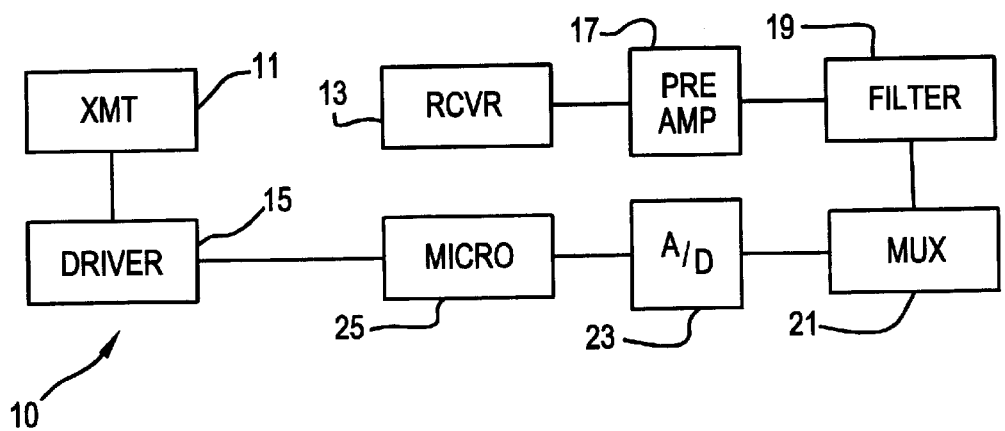
FIG. 1 shows a schematic representation of a magnetic field position and orientation system.

FIG. 1 shows a typical magnetic position and orientation system 10 consisting of at least one magnetic transmitter 11 and at least one magnetic receiver 13. The system 10 also schematically shows a driver 15 for driving the transmitter 11 in a manner well known to those skilled in the art, a preamp 17 receiving signals from the receiver 13, which signals are filtered by the filter 19 and then sent to a multiplexer 21 that sequentially sends the signals to an A/D converter 23, which feeds the signals to a microcomputer 25. As shown, the microcomputer 25 sends signals to the driver 15 to control the transmitter 11.

Figure 2:
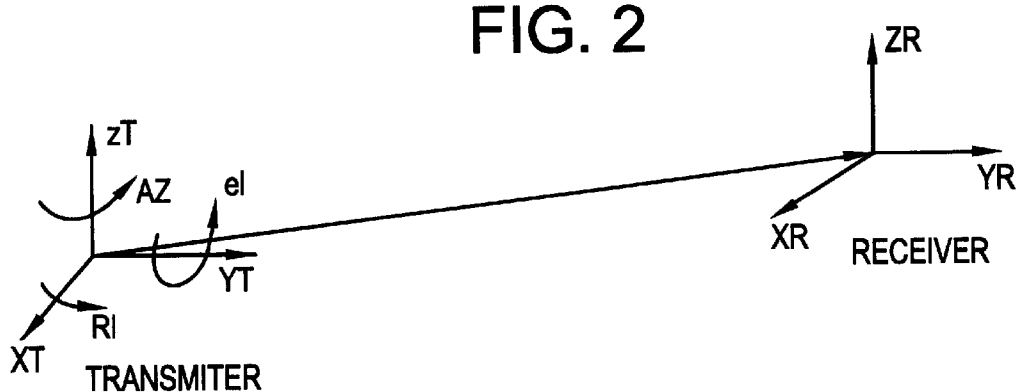
FIG. 2 shows the geometry of the magnetic position and orientation system of FIG. 1.

FIG. 2 shows the geometry of the magnetic position and orientation system of FIG. 1. The magnetic transmitter element most often is a coil, but it can be any kind of transmitter that can transmit a magnetic field. The transmitter can have one axis (one coil placed to generate a magnetic coil in the x-axis direction), or two axis (one coil placed to generate a magnetic field in the x-axis direction and a second coil placed to generate a magnetic field in the y-axis direction) or three axis, one coil placed to generate a magnetic field in the x-axis direction and a second coil placed to generate a magnetic field in the y-axis direction and a third coil placed to generate a magnetic field in the z-axis direction). The transmitter coils can also have up to six coil elements and some or all of the elements can be placed at separate physical locations. The transmitter coil can be driven by a current pulse or an AC signal. The magnetic position and orientation system measures the position (x, y, z) and orientation (az, el, rl) in up to six degrees of freedom. If desired, the transmitter can be two axis and the receiver three axis or the transmitter can be three axis and the receiver two axis. For a system which measures only up to five degrees of freedom, the receiver can be single axis and the transmitter at least five elements. The receiver can also be at least five elements and the transmitter can be single axis. The system can use the complete free-space equations or the system can utilize approximations. The system can include co-planar, non-coplanar, concentric or non-concentric elements for the receiver and transmitter.

The magnetic field generated from a coil is defined by the formula:

$$B = NAI\mu_r \quad (1)$$

The received signal at the receiver coil is defined by the formula:

$$E = NA * dB/dt\mu_r \quad (2)$$

The receiver consists of elements that are capable of either measuring the magnetic field, B, or the time variations of the magnetic field, dB/dt. Flux-gates, Magneto-resistive devices, Hall-effect devices and coils followed by an integrator are commonly used to measure the magnetic field. A simple coil is commonly used to measure the time derivative of the magnetic field.

It is simple to utilize a magnetic transmitter and a magnetic receiver to make a position and orientation system that can measure in up to six degrees of freedom, position (x, y, z) and orientation (az, el, rl). Equations can be made and the position and orientation found, at least five equations with five unknowns for five dimensions and at least six equations with six unknowns for six dimensions. The solutions, the position (x, y, z) and orientation (az, el, rl) of the receiver relative to the transmitter can be easily found using the methods described in U.S. Pat. Nos. 4,314,251 and 4,054,881. Calibrations can be made to the transmitter and the receiver for non-orthogonalities, misalignments, gain, transmitter power and finite size of the transmitter and the receiver. The received signal is in-phase with the transmitted signal if corrected for the phase shifts in the electronics. This is all based on free-space ideal conditions. However, if any metallic material is placed in the vicinity of the magnetic position detecting and measuring system, a distortion will occur and measurements made by the system will be inaccurate. The metal distortion consists of two elements, one in-phase with the transmitted signal, and one in-quadrature with the transmitted-signal. Measurements of the in-phase signal depend upon the direct transmitted signal and the metal and its placement relative to the transmitter and receiver. Measurements of the in-quadrature signal depend upon only the metal and its placement relative to the transmitter and receiver.

Figure 3:
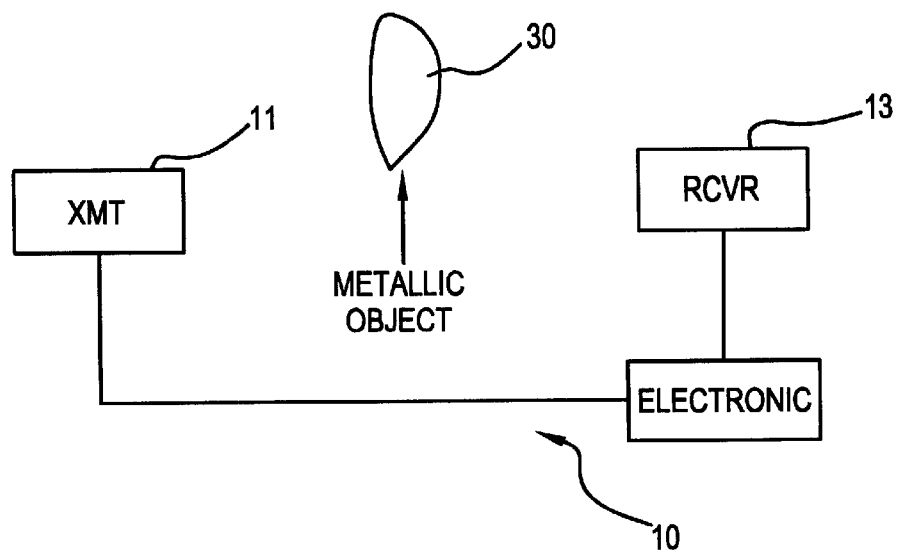
FIG. 3 shows a magnetic field position and orientation system with a metallic object in its environment.

There are two different types of metals, conductive metals (relative permeability, $\mu_r$, equal to 1) and ferrous metals (conductive with relative permeability, $_r$, not equal to one), which cause distortion if placed in the vicinity of the magnetic transmitter or the magnetic receiver in a magnetic position and orientation system. FIG. 3 shows a piece of metal 30 placed in the vicinity of the transmitter 11 and the receiver 13. If a metallic object 30 is placed in the environment of the magnetic field position measurement system 10, it will cause a distortion in the magnetic field, therefore, causing an error in the position determination if compensation is not carried out. Known AC and DC magnetic position and orientation systems suffer from the inaccuracies created by this distortion. Metallic objects of both a conductive and a ferrous nature each disrupt the magnetic field, at the receiver, that is produced by the transmit coil, however, in different manners. In either case, the magnetic field produced by the transmit coil is disrupted in a manner that generates an "error" voltage in the receiver coil.

Conductive metals have a relative permeability equal to 1. Conductive metals are metals such as Aluminum ($\sigma=4.0*10^5$/ohmcm), Copper (6,4), Brass (4.1), Gold (4.9), Nickel (1.6), Silver (6.6), Tin (0.8), Titanium (0.2), Stainless Steel (1.0), Zinc (1.8). When a conductive metal is placed in a changing external magnetic field, an eddy current will be created inside the metal and a magnetic field of opposite direction will be generated. If the external magnetic field stops changing, the induced eddy currents will dissipate very quickly. The induced eddy current depends upon: 1) the magnetic field strength and its time of change, 2) the size, shape and thickness of the metal, and 3) the orientation of the metal with relation to the magnetic field.

Figure 4A:
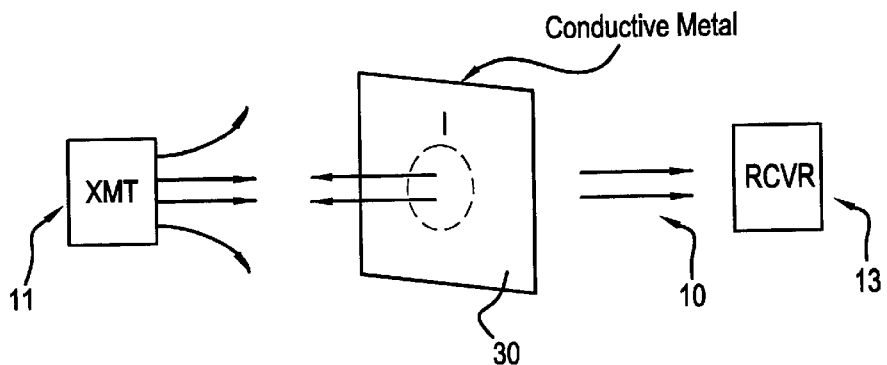
FIGS. 4a and 4b show the distortion made by a conductive metal object placed in various positions.

FIG. 4a shows the eddy currents and the magnetic field created by the eddy currents for a conductive metal plate 30 placed vertical to the magnetic field generated by the transmitter 11.

Figure 4B:
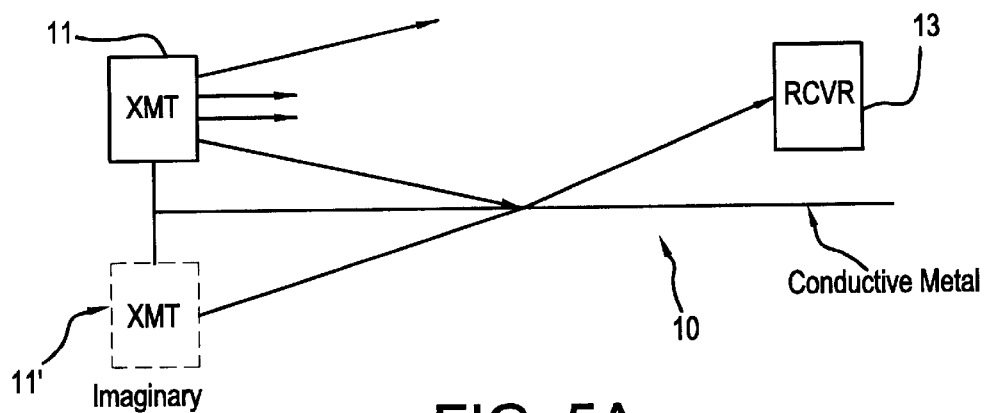

The received magnetic field at the receiver 13 is the sum of the magnetic field generated by the transmitter plus the magnetic field generated by the eddy current. Since the two magnetic fields have opposite signs, this means that the distortion created by the conductive metal will cause a reduction in the magnetic field received at the receiver. FIG. 4b shows the eddy currents and the magnetic field generated by the eddy currents for a conductive metal plate placed horizontally in the magnetic field generated from the transmitter 11. The two magnetic fields have the same sign, which means that the distortion created by the conductive plate causes an increase in the magnetic field received at the receiver 13. An approximation to the eddy current created magnetic field can also be found by replacing the metal plate with an imaginary transmitter 11' using complex image theory.

Figure 5A:
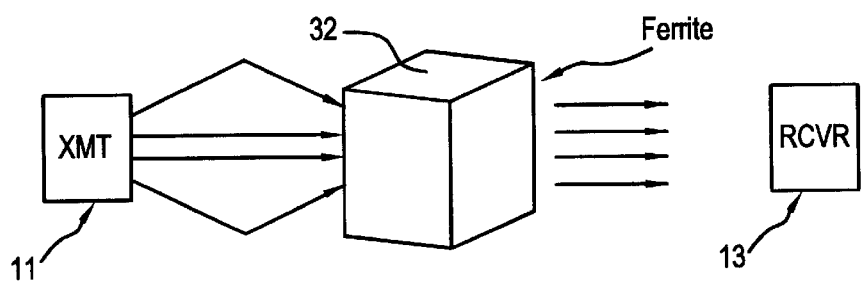
FIGS. 5a and 5b show the distortion made by a ferrous metal object placed in various positions.
Figure 5B:
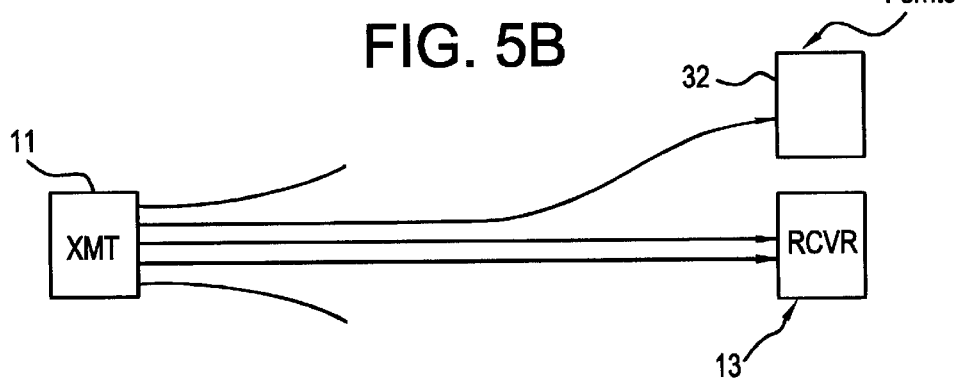

Ferrous metals are conductive metals with relative permeability larger than 1. Ferrous metals include Iron ($\sigma=1.1*10^5$/ohmcm and $\mu_r=100-500$), Cold rolled steel Iron ($\sigma=1.1*10^5$/ohmcm and $\mu_r=180$), hot rolled steel ($\sigma=1.1*10^5$/ohmcm and $\mu_r=150$), mumetal ($\sigma=0.2*10^5$/ohmcm and $\mu_r=20000$), and ferrite ($\sigma=1.0*10^{-3}$/ohmcm and $\mu_r=1000$). If a ferrous metal is conductive, it will cause eddy current distortions as described above and, additionally, when a ferrous metal is placed in an external magnetic field, it attracts the magnetic flux lines to flow through the metal and thereby distorts the magnetic field. If the ferrous metal's conductivity is equal to zero, it will have no eddy current distortions. FIG. 5a shows a ferrous metal object 32 with zero conductivity placed between the transmitter 11 and the receiver 13. The ferrous metal attracts the flux lines and thereby causes a bigger magnetic field to be received at the receiver 13. FIG. 5b shows a ferrous metal object 32 with zero conductivity placed in the vicinity of the receiver 13. The ferrous metal attracts the magnetic flux lines and thereby causes a smaller magnetic field to be received at the receiver 13.

Figure 6:
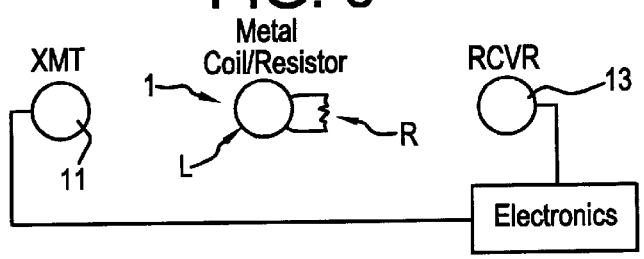
FIG. 6 shows the "conducting coil" model for conductive metals.

The simplest model for a conductive metal considers the metallic object 1 as an inductance, L, and a resistor, R, in parallel as shown in FIG. 6. The magnetic field caused by the metal at the receiver 13 is defined by the formula:

$$B_m = K * M_{01} M_{12} / L * ((\alpha^2 + i\alpha)/(1+\alpha^2)) H_0 e^{i\omega t} \quad (3)$$

Where $\alpha = \omega L/R$ and K depends upon the distance between the metallic object 1 and the transmitter 11 and upon the distance between the metallic object 1 and the receiver 13.

Figure 7:
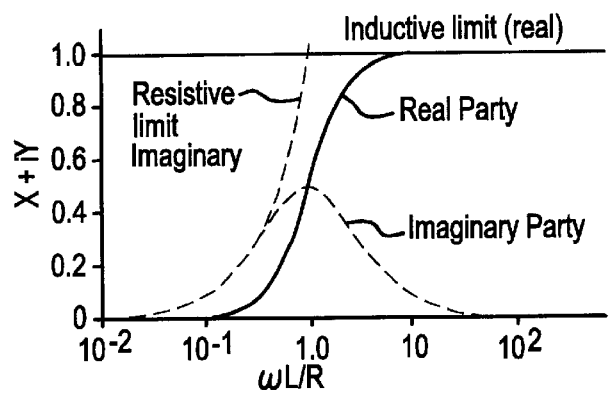
FIG. 7 shows a graph of the theoretical scattered magnetic field from a conducting loop in a uniform field.

FIG. 7 shows a graph of the magnetic field at the receiver 13 as a function of the $\omega L/R$. It can be seen that it has two elements: a real part, the in-phase element, and an imaginary part, the in-quadrature element. It shows that the inductive limit, $M_{01}M_{12}/L$, will be reached at a high enough frequency. The imaginary part will also be zero at the same frequency.

Theory and calculations are made for the model which considers the metallic object a sphere in a uniform alternating field, for conducting metal sheets in a dipole field, and for spherical objects in a magnetic field. It shows that the "conducting coil" model is a very good approximation for conductive metals.

Figure 8:
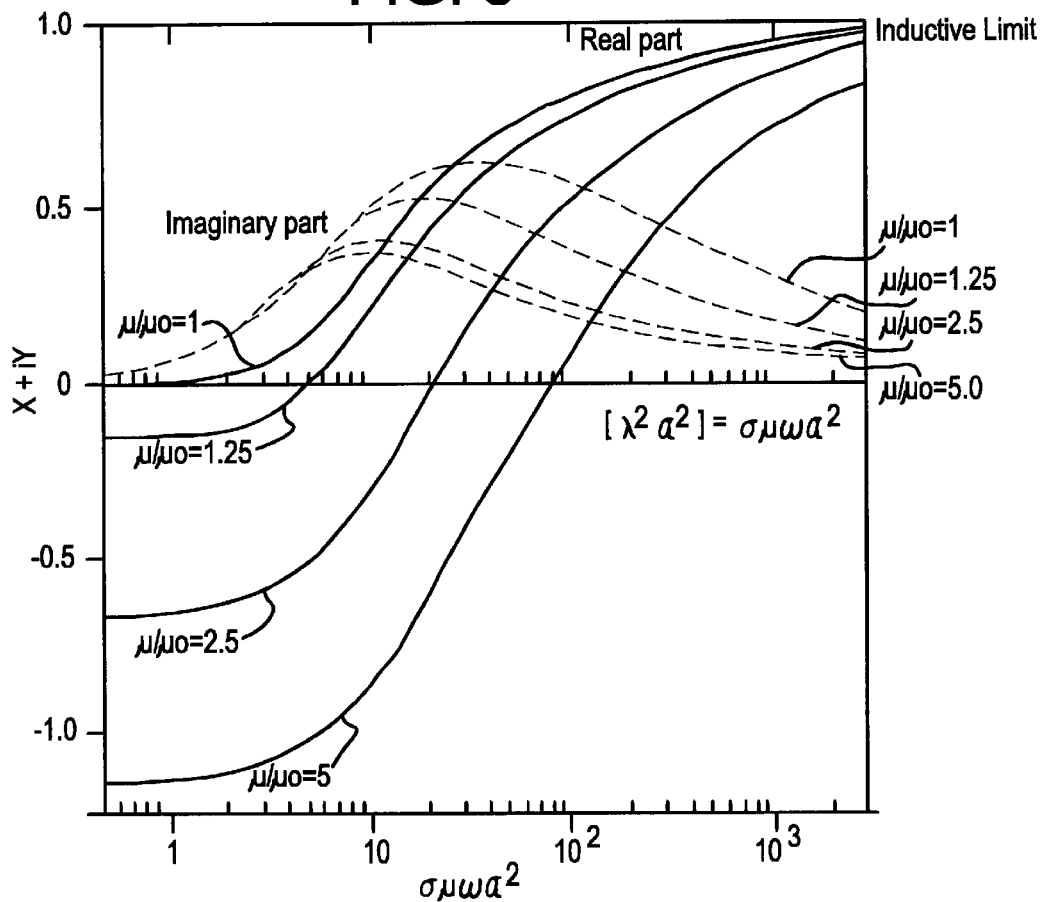
FIG. 8 shows a graph of the theoretical scattered magnetic field from a conducting sphere in a uniform field.

FIG. 8 shows a graph of the magnetic field, caused by a metallic sphere, at the receiver as a function of $\alpha^2$. Curves are shown for different relative permeabilities. For the relative permeability equal to 1, the field is very much the same as the field found from the "inductance and resistor in parallel" model. For a metal with a relative permeability greater than one, the in-phase part will go from the inductive limit to zero to a negative value as the frequency goes toward zero. The negative value of the in-phase part at the frequency equal to zero will be more and more negative as the relative permeability gets larger.

FIG. 8 shows that the scattered field from a ferrous metal is significantly different than the scattered field from a conductive metal (relative permeability equal to 1). For a conductive metal, both the in-phase part and the in-quadrature part of the response is equal to zero at the frequency equal to zero (DC). For a ferrous metal with the relative permeability larger than zero, the in-phase part of the response will be different from zero at the frequency equal to zero (DC). This is why the existing DC magnetic field trackers have a problem with distortion from ferrous metallic objects. This is also why the compensation technique using two different frequencies (one very close to zero, less than 200 Hz) will not work if ferrous metals are present in the environment. Equation 4 shows the response for a conducting sphere as $\alpha^2$ goes toward zero:

$$B_m = K(4\eta\alpha^3((\mu-\mu_0)/(\mu+2\mu_0)) - 2\eta\alpha^3(i\sigma\mu_0\omega\alpha^2/15)((3\mu_0)/(\mu+2\mu_0)))H_0 e^{i\omega t} \quad (4)$$

Where K depends upon the distance between the metal and transmitter and upon the distance between the metal and the receiver and $\mu$ is the permeability of the metal and $\sigma$ is the conductivity of the metal.

It can be seen that when the permeability is large, the variable element goes towards 1. A permeability larger than 100 will not change the result too much. Equation 5 shows the response for a conducting sphere as $\sigma\mu\omega\alpha^2$ goes toward infinity.

$$B_m = -K2\eta\alpha^3 * H_0 e^{i\omega t} \quad (5)$$

Where K depends upon the distance between the metal and transmitter and upon the distance between the metal and the receiver.

Figure 9A:
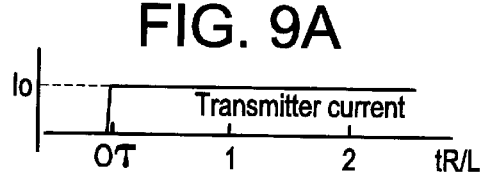
FIGS. 9a–9e show graphs of the transient response of a conducting loop.
Figure 9B:
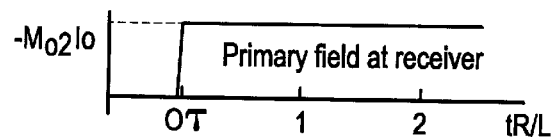
Figure 9C:
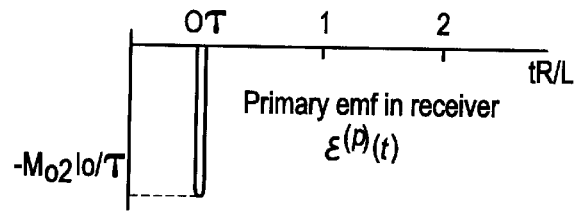
Figure 9D:
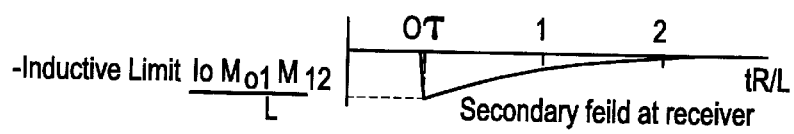
Figure 9E:
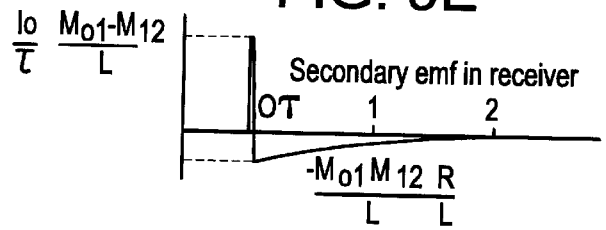

FIGS. 9a–9e show the transient of the magnetic field for the "conducting loop" model. FIG. 9d shows the magnetic field, caused by the conductive metal, at the receiver 13. It is seen that the magnetic field decays exponentially after the transition following the formula given in (6) and that the magnetic field is equal to the inductive limit right after the transition.

$$B_m = -KM_{01}M_{12}/LI_0 e^{-Rt/L} \quad (6)$$

Where K depends upon the distance between the metal and the transmitter and upon the distance between the metal and the receiver, and where $M_{01}$ is the mutual inductance between the transmitter coil and the receiver coil and $M_{12}$ is the mutual inductance between the "metal" coil and the receiver. $MO_{01}*M_{12}/L$ is the metal's inductive limit.

There is a quite evident relationship between the harmonic (AC) and the transient responses. The decay time constant of the exponential decay of the "metal" field corresponds to the angular frequency $\Omega$ at which the har monic response has a phase angle of 45 degrees, since:

$$\Omega L/R = 1 \text{ therefore } \Omega = R/L = 1/T \quad (7)$$

Furthermore, the amplitude of the magnetic field, caused by the conductive metal strength at the beginning of the decay is equivalent to the inductive limit of the response to a harmonic source. However, there is no such correspondence between the induced emfs in the two cases, since the latter are proportional to the time derivatives of the magnetic flux passing through the receiver and not the flux itself.

Figure 10:
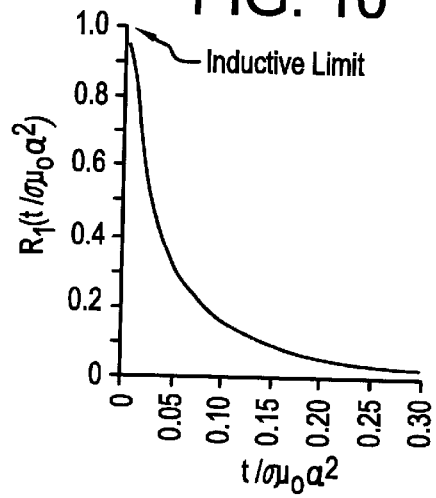
FIG. 10 shows a graph of the transient response of a conducting sphere.

FIG. 10 shows a graph of the decay of a transient response to a conducting sphere. It is seen that the decay is exponential and that the time constant is equal to:

$$T = 1/\sigma\mu_0\alpha^2 \text{ for } \mu_r = 1 \quad (8)$$

A conductive metal can be treated as a coil in parallel with a resistor for use in the signal analysis as shown above. The inductance of the coil and the resistance of the resistor depend on the size, shape and type of material. FIG. 6 shows the magnetic field position and orientation system 10 with one transmitter coil 11 and one receiver coil 13. The conductive metal is replaced by a coil in parallel with a resistor.

There are two different methods of analyzing the magnetic field and the received signals in magnetic position and orientation systems: 1) Time domain analysis, and 2) Frequency domain analysis.

Time domain analysis is used when a magnetic field pulse is generated by the transmitter. A magnetic pulse is generated and held until the eddy currents have died out. The pulse is then returned to zero and measurement of the eddy current distortion is started after this transition. The results show that it takes less than approximately a few milliseconds for eddy currents to die out when the material is aluminum, and somewhat shorter when the material is steel.

The received magnetic field at the receiver as a function of time, from a pulse generated by the transmitter, is shown in FIG. 11. The received pulse is a pulse similar to the one generated by the transmitter, if no metals are present in the environment. The eddy current magnetic field shows up when the transmitted pulse changes from zero to its final value. It quickly dies out after the magnetic pulse has stopped changing. The eddy current again shows up when the transmitted pulse is changed from its maximum value down to zero again. The distortion quickly dies out.

Figure 11A:
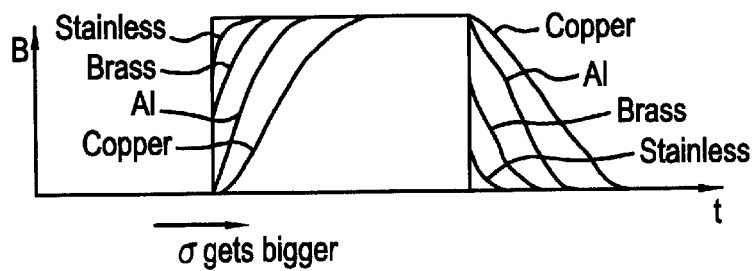
FIGS. 11a and 11b show graphs of the pulse magnetic field at the receiver with conductive metals present.
Figure 11B:
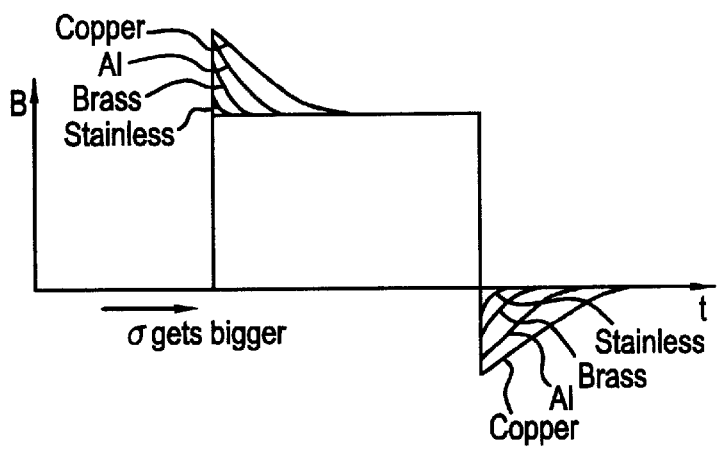

FIG. 11a shows the eddy current distortions for various metals when the two magnetic fields have opposite signs as for a placement as shown in FIG. 4a. The larger the conductivity of the metal, the longer it takes for the eddy current distortion to die out. The smaller the conductivity, the faster the eddy current distortion dies out. The initial value of the eddy current distortion depends upon the size, shape and placement of the metal in the magnetic field. FIG. 11b shows the eddy current distortions for various metals when the two magnetic fields have the same sign as for a placement of the metals as shown in FIG. 4b.

For a plate placed perpendicular to the magnetic field between the receiver and transmitter, the complex image technique shows that the metal can be replaced with a second transmitter at equal distance to the metal but of opposite signal. This means that the magnetic field at the receiver will be subtracted. If a large piece of metal is placed parallel to the field on top of both the transmitter and receiver, the complex image technique shows that the metal can be replaced with a second transmitter of opposite signal to the first transmitter at an equal distance away from the metal.

The received magnetic field at the receiver, as a function of time, from a pulse generated by the transmitter is shown in FIG. 12. The received pulse is a pulse similar to the one generated by the transmitter, if no ferrous metals are present in the environment. The eddy current magnetic field shows up when the transmitted pulse changes from zero to its final value. It quickly dies out after the magnetic pulse has stopped changing. The eddy current again shows up when the transmitted pulse is changed from its maximum value down to zero again. The distortion quickly dies out. For a ferrous metal, the pulse level is different than the one generated by the pulse from the transmitter.

Figure 12A:
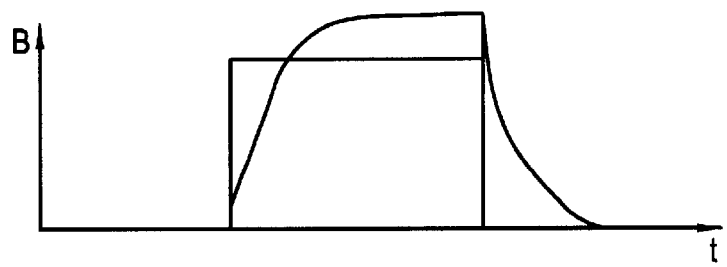
FIGS. 12a and 12b show graphs of the pulse magnetic field at the receiver with ferrous metals present.
Figure 12B:
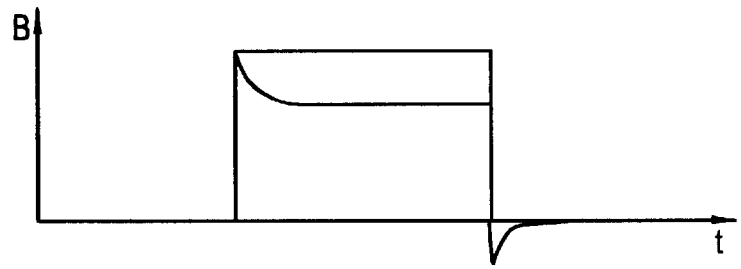

FIG. 12a shows the ferrous metal distortions when the two magnetic fields have opposite signs as for a placement as shown in FIG. 5a. FIG. 12b shows the ferrous metal distortions when the two magnetic fields have the same sign as for a placement of the metals as shown in FIG. 5b.

The frequency domain is generally used when a time varying AC signal is generated by the magnetic transmitter.

Figure 13:
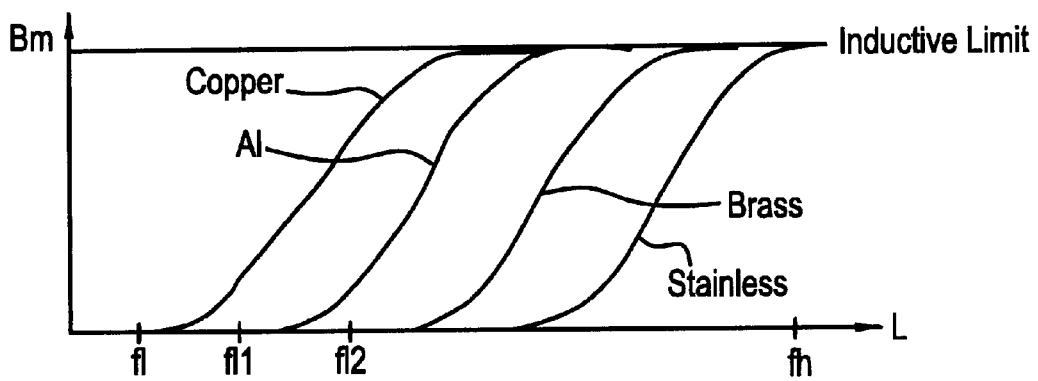
FIG. 13 shows a graph of the frequency response of a magnetic field with conductive metals present.

FIG. 7 shows a graph of the response of the metal as a function of $\omega L/R$. The in-phase part is equal to the in-quadrature part if $\omega L/R=1$. The in-phase part changes from zero to the inductive limit. The in-quadrature part changes from zero to half the inductive limit and back to zero. The phase changes from 90 degrees to zero. The sign depends upon the placement of the metal 20 in the magnetic field, only one sign is shown here. The size of the inductor L and of the resistor R depend upon the size, shape and conductivity of the metal. The response is shown normalized. FIG. 13 shows the in-phase magnetic response as a function $\omega L/R$ for various conductive metals.

FIG. 8 shows a graph of the magnetic field, caused by a metallic sphere, at the receiver, as a function of $\omega \mu \sigma a^2$.

Figure 14:
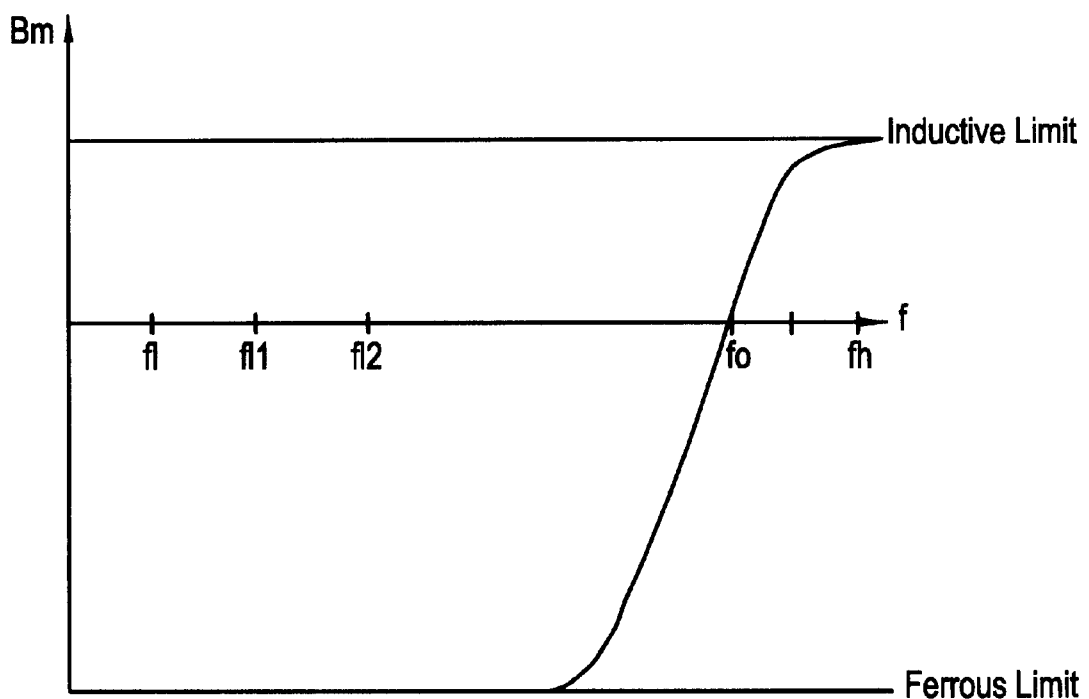
FIG. 14 shows a graph of the frequency response of a magnetic field with ferrous metals present.

FIG. 14 shows a graph of the magnetic field, caused by a metallic sphere, at the receiver as a function of $\omega \mu \sigma a^2$ with a relative permeability larger than 100. FIG. 14 shows that for a metal with a large relative permeability, the in-phase part will go from the inductive limit to zero to a negative value twice the inductive limit as the frequency goes toward zero.

Prior knowledge about metals will allow the system to create a look-up table with optimal frequency for each known metal and the pulse plot for each known metal. If the metals in the environment are known prior to use, the system can analyze the metals from stored plots of frequency response and pulse response and pick, first, which method is best and then, second, the optimum frequencies.

Figure 15:
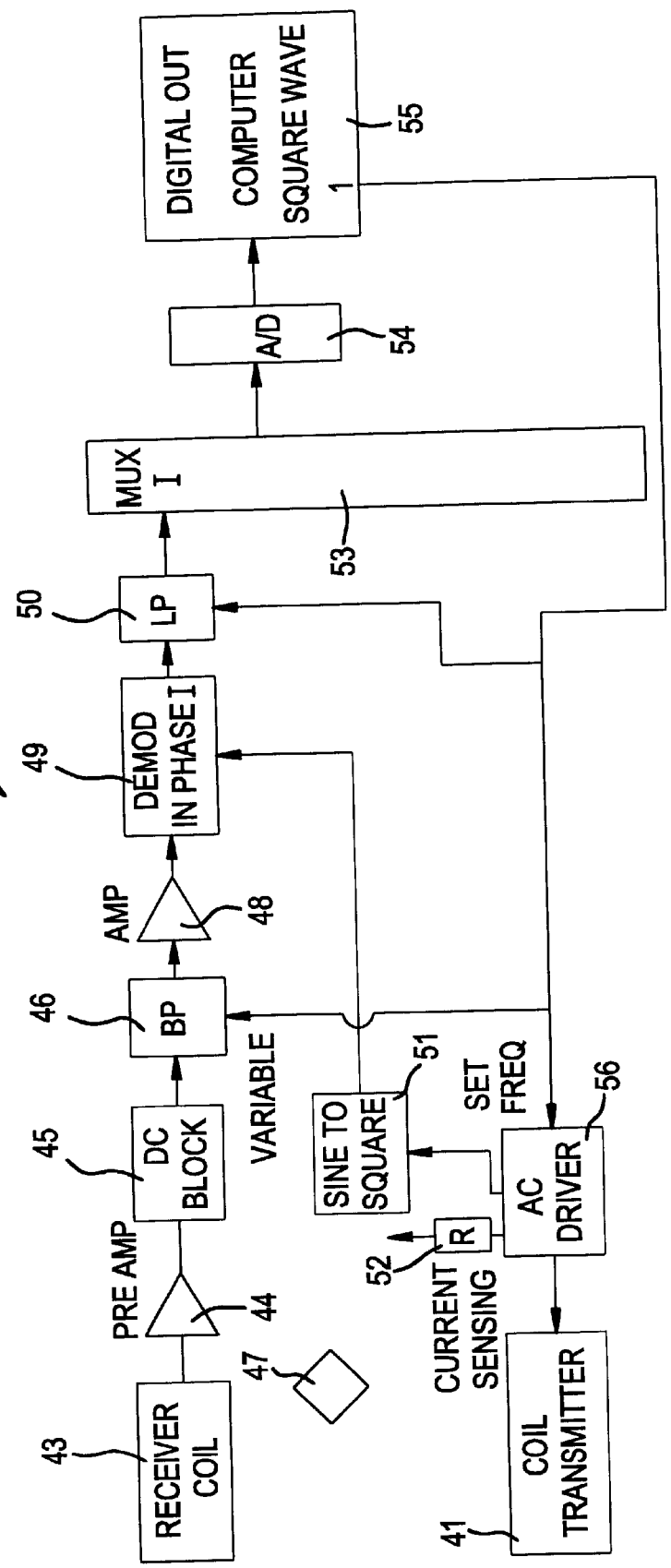
FIG. 15 shows a first embodiment of an AC magnetic field position and orientation system in accordance with the teachings of the present invention which is also used in the third and fourth embodiments thereof.

FIG. 15 shows a first embodiment of a magnetic field position and orientation measurement system 40 in accordance with the teachings of the present invention with only one transmitter 41 and one receiver 43. The transmitter transmits an AC magnetic field. The receiver is capable of measuring the time derivative of the magnetic field dB/dt. The transmitter transmits a sine wave so the magnetic field is found from the received signal divided by $\omega$. The receiver can also be of the type that measures the magnetic field: Hall effect device, Magnetoresistive device, Coil followed by an integrator or any other type of sensor that can measure the magnetic field. A DC block 45 is used after preamp 44 to prevent measuring of the DC magnetic field or the Earth's magnetic field. The system is capable of measuring the in-phase received magnetic field, I, with the transmitted magnetic field, at this frequency by utilizing a tracking bandpass filter 46, a variable gain amplifier 48 and a demodulator 49 followed by a tracking low pass filter 50. The demodulator is controlled from a square wave from the sine-to-square converter 51, which is fed from the current sensing resistor 52, which measures the current in the transmitter and therefore is in-phase with the transmitted magnetic field. The received in-phase signal is fed into a multiplexer 53 which is connected via an A/D converter 54 to a computer 55. The computer controls the transmission of the magnetic fields via an AC driver 56 which is connected to the coil transmitter 41. The transmission frequency is selected and set by the computer, which also controls the tracking filters in order to receive the transmitted frequency signal. A metallic object 47 is shown that will cause a metallic distortion of the magnetic field and therefore cause an error in the position determination of this system, if compensation is not carried out.

FIGS. 7 and 13 show that if a low enough frequency, $f_1$, is used, then the in-phase eddy current distortion is approximately equal to zero. The eddy current distortion is equal to zero at DC. If multiple conductive metals are present, a frequency sufficiently low, $f_1$, so that the metal with the highest conductivity, here copper, will have its in-phase part of the metal field sufficiently close enough to zero. It can be seen from these figures that the in-phase part is closer to zero that the in-quadrature part.

If the metals used in the environment are known, it is then easy to select an appropriately low frequency, $f_1$, that is the highest frequency where the in-phase part of the magnetic field is still approximately zero. If the metals used in the environment are not known, a frequency, $f_1$, is used which is sufficiently low enough in order to compensate for the potential of a metal with a high conductivity that may be present in the environment. Higher frequencies may be desirable for other design considerations such as filtering out 50/60 Hz and harmonics noise and due to the magnetic noise as a function of the frequency, and it is best to select a frequency higher than 100 Hz but generally lower than 300 Hz. Another consideration is the speed of the measurements, here again, a higher frequency is desirable since it will allow a higher measurement rate.

This embodiment compensates for conductive metal distortion. It still works if ferrous metals are present. However, it does not compensate for the increase in magnetic field caused by ferrous metals at low frequencies.

Figure 16:
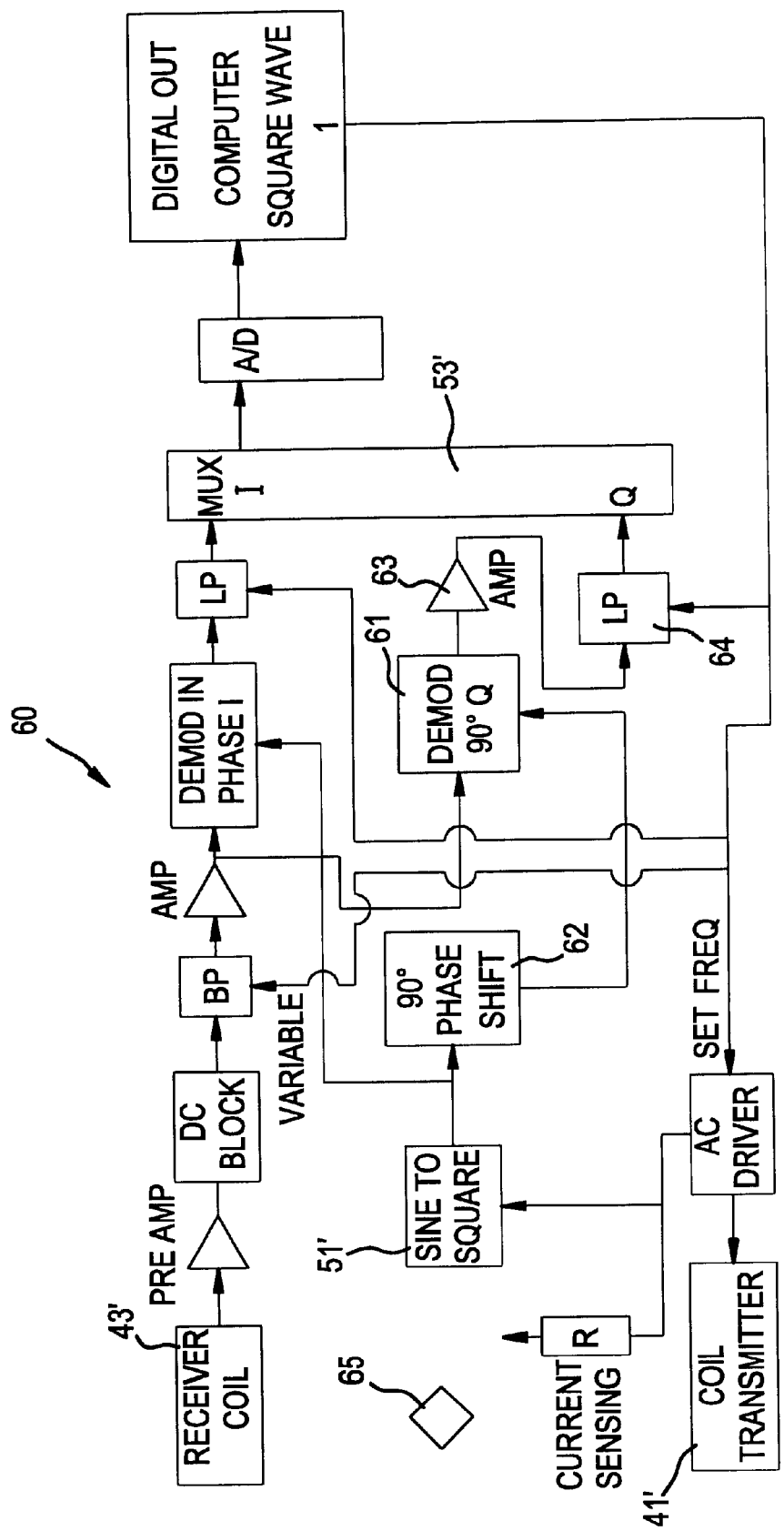
FIG. 16 shows a second embodiment of an AC magnetic field position and orientation system with in-phase and in-quadrature capabilities which is also used in the eighth embodiment thereof.

FIG. 16 shows a second embodiment of magnetic field position and orientation measurement system 60 in accordance with the teachings of the present invention with only one transmitter 41' and one receiver 43'. The system 60 contains the entire system 40 illustrated in FIG. 15 (like elements being designated with like primed reference numerals) with an additional demodulator 61 which enables the system to also measure in quadrature (90 degrees out of phase) with the transmitted magnetic field. The demodulator is controlled from a 90 degree converter 62, which is fed from the sine to square converter 51'. The demodulator signal is fed into an amplifier 63, which is fed into a tracking low pass filter 64, which feeds into the multiplexer 53'. The transmitter transmits an AC magnetic field with at least two frequencies. The receiver 43' is capable of measuring the time derivative of the magnetic field dB/dt. The transmitter 41' transmits a sine wave so the magnetic field is found from the received signal divided by $\omega$. The receiver can also be of the type that measures the magnetic field: Hall effect device, Magnetoresistive device, Coil followed by an integrator or any other type of sensor that can measure the magnetic field. A DC block is used in order to avoid measuring the DC magnetic field or the Earth's magnetic field. The system is capable of measuring the in-phase, I, and the in-quadrature, Q, received magnetic field, with the transmitted magnetic field at these frequencies, by utilizing a tracking bandpass filter and demodulators. The transmission frequencies are selected and set by the computer, which also controls the tracking filters in order to receive the transmitted frequency signals. A metallic object 65 is shown that will cause a metallic distortion of the magnetic field and therefore cause an error in the position determination of this system, if compensation is not carried out.

Two low frequencies, $f_{11}$, and $f_{12}$, (these frequencies are generally between 300 Hz and 3 kHz) are chosen that will be in the area where the most common metals will have measurable quadrature 10 signals and no metals have reached the inductive limit as per FIG. 13. The two frequencies can be transmitted sequentially or simultaneously. The system here is shown for sequential operation. The inductive limit and the decay time constant (T=L/R) can be found from the two in-quadrature received signals:

$$Q_{11}=KM_{01}*M_{12}/L*\alpha_{11}/(1+\alpha_{11}^2) \quad (9)$$

$$Q_{12}=KM_{01}*M_{12}/L*\alpha_{12}/(1+\alpha_{22}^2) \quad (10)$$

Where $\alpha_1=\omega_1*L/R$ and $\alpha_2=\omega_2*L/R$.

The calculated inductive limit ($KM_{01}*M_{12}/L$, at the given placement of metals, receiver and transmitter) and the decay constant are then used to find the expected difference between the two in-phase signals as shown in equation 11;

$$I_{11}-I_{12}=KM_{01}*M_{12}/L*((\alpha_{12}^2/(1+\alpha_{12}^2)-(\alpha_{11}^2/(1+\alpha_{11}^2)) \quad (11)$$

If the expected difference is equal to the measured difference, then the metals are purely conductive and the signal free from metal distortion is found from $I=I_{11}+KM_{01}*M_{12}/L*(\alpha_{11}^2/(1+\alpha_{11}^2))$.

If the expected difference is not equal to the measured difference, then the metals are ferrous and curve fitting is used on the in-phase signals $I_{11}$ and $I_{12}$ in order to find the in-phase signal $I_1$ at a low enough frequency so that the signal is approximately equal to the one found at DC. The signal free of metal distortion is then found from $I=I_1+-2*$inductive limit, where the polarity sign is plus if $I_{12}>I_{11}$ and negative if $I_{12}<I_{11}$. More transmission frequencies can be used in order to improve the curve fitting.

This embodiment compensates for both ferrous and conductive metal distortion.

The system shown in FIG. 15 is used in a third embodiment. FIG. 8 shows the "metal" magnetic field for increasing values of the relative permeability. It can be seen that simply choosing a low frequency will not compensate for these types of metals since an increase in the received magnetic field will occur at low frequencies. If a high enough frequency is chosen, then the metal distortion will act as an eddy current at its inductive limit.

If the ferrous metal is known or a frequency plot is made, it is possible to operate at a frequency, $f_0$, close to where the in-phase part is zero and thereby the received magnetic field is found free of metal distortion. Note that the quadrature part is still different from zero. The frequency, $f_0$, (between 1 to 8 times $f_T$ and generally approximately 20–30 kHz for metals with a relative permeability>100) varies considerably due to metal size, shape and placement in the environment. It is also worth noting that selecting a low frequency, $f_1$, in order to compensate for conductive metals in the measuring space will cause the ferrous metal distortion problem to be worse and choice of a frequency around the frequency, $f_0$, to compensate for the ferrous metal distortion problem, will cause the conductive metal distortion problem to be worse than before.

This embodiment can be utilized if multiple ferrous metals are present in the environment. The frequency, $f_0$, must then be chosen as a compromise between all the ferrous metals present at any given time.

This embodiment only compensates for ferrous metal distortion. It also works effectively if conductive metals are present. It does not, however, compensate for the eddy current distortion caused by conductive metals.

The system shown in FIG. 15 is used in a fourth embodiment in which two frequencies are employed. The low frequency, $f_1$, (generally below 300 Hz), is chosen so that the in-phase received magnetic field will be at its maximum level. It is approximately constant for low frequencies, as shown in FIG. 8. The high frequency, $f_h$, (generally between 20 kHz and 200 kHz depending upon the relative permeability of the metal), is chosen so that the inductive limit has been reached, as also shown in FIG. 8. The magnetization from a ferrous sphere, which is in-phase with the transmitted signal, can be found from the following formula:

$$B_1=K4\pi a^3*(\mu-\mu_0)/(\mu+2\mu_0)H_0e^{i\omega t} \quad (12)$$

Where K depends upon distance between the metal and the transmitter and upon the distance between the metal and the receiver. Equation (12) simplifies to:

$$B_1=K4\pi a^3*(\mu-\mu_0)/(\mu+2\mu_0)H_0e^{i\omega t} \quad (13)$$

when $\mu_x>100$, which is the case for most ferrous metals.

The magnetic field at $f_h$ can be found from:

$$B_h=-K2\pi a^3 H_0 e^{i\omega t} \quad (14)$$

Where K depends upon distance between the metal and the transmitter and upon the distance between the metal and the receiver.

For most common ferrous metals $\mu_x>100$, where $B_h=-B_1*2$, the received magnetic field, free of ferrous metal distortion, can be found from the two measurements:

$$I=I_h+(I_1-I_h)/3 \quad (15)$$

This embodiment only compensates for ferrous metal distortion. It works as well if conductive metals are present. It does not, however, compensate for the eddy current distortion caused by conductive metals.

Figure 17:
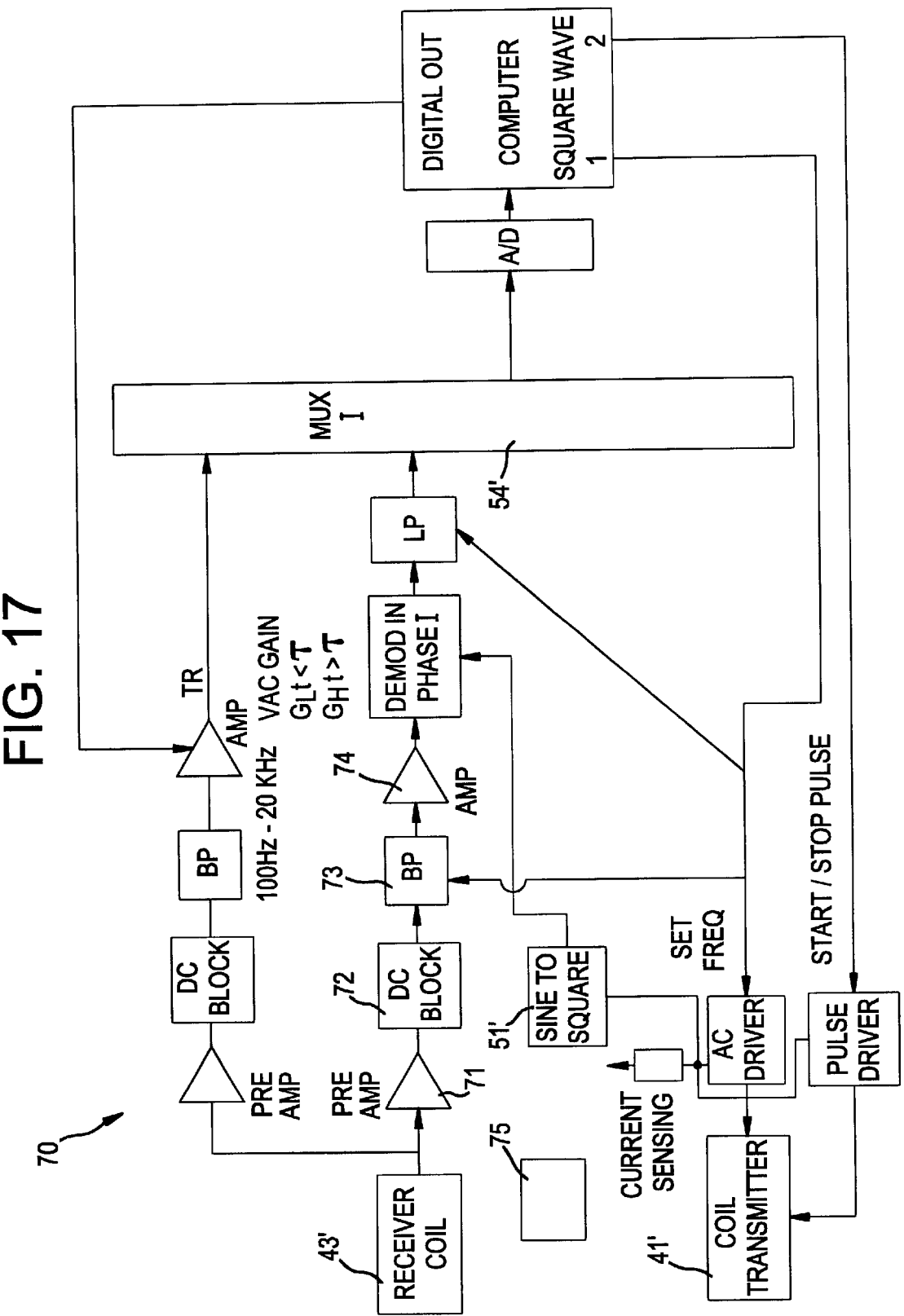
FIG. 17 shows a fifth embodiment of the present invention of an AC magnetic field position and orientation system with transition capability.

FIG. 17 shows a fifth embodiment of the present invention in which a simple magnetic field position measurement system 70 with only one transmitter and one receiver that transmits two frequencies and compensates for both conductive and ferrous metals. The transmitter transmits an AC magnetic field at at least two frequencies. The system contains the entire system 40 shown in FIG. 15 (like elements being designated with like primed reference numerals). The system further includes a pre-amp 71 which is fed from the receiver coil 43'. The pre-amp 71 connects to a DC block 72, a wide bandpass filter 73 and a variable gain amplifier 74, which is fed directly into the multiplexer 54'. The receiver 43' is capable of measuring the time derivative of the magnetic field dB/dt. The transmitter 41' transmits a sine wave so the magnetic field is found from the received signal divided by ω. The receiver 43' can also be of the type that measures the magnetic field: one of a Hall effect device, a Magnetoresistive device, a Coil followed by an integrator or any other type of sensor that can measure the magnetic field. A DC block 72 is used in order to avoid measuring the DC magnetic field or the Earth's magnetic field. The system is capable of measuring the in-phase, I, with the transmitted magnetic field, and the received magnetic field at these frequencies by utilizing a tracking bandpass filter and demodulator. The transmission frequency is selected and set by the computer, which also controls the tracking filters in order to receive the transmitted frequency signals. A metallic object 75 is shown that will cause a metallic distortion of the magnetic field and therefore cause an error in the position determination of this system, if compensation is not carried out. The system is further capable of transmitting a pulse of magnetic field with a very fast transition time from its maximum value to zero. The system measures the received decaying magnetic field after the transition. The transition signal is shown here as a part of the AC signal. The transition signal can be a separate part and thus allow a higher transition signal if necessary.

FIG. 8 shows the "metal" magnetic field for increasing values of the relative permeability. It can be seen that simply choosing a low frequency will not compensate for these types of metals since an increase in the received magnetic field will occur at low frequencies. If a high enough frequency is chosen, then the metal distortion will act as an eddy current at the inductive limit.

The high frequency $f_h$ is chosen so that the metal distortion will act as an eddy current at the inductive limit, see FIGS. 8 and 14. An AC magnetic field is generated at the high frequency, $f_h$, and the received signal is stored in the memory.

The last part of the AC sine wave in the transmitter is then held at its maximum level for approximately 5 mSec. The level is then changed to zero through a very fast transition, approximately 50 $\mu$Sec. The system measures the received decaying magnetic field continually after the transition and first stops when the decaying signal is approximately 40% of the first read signal. It is then possible to find the magnetic field right after the transition has ended. This value is the inductive limit. See FIG. 9. If the time derivative dB/dt is measured, it is then possible to find the value right after the transition has ended. This is 1/T times the inductive limit. It is also possible to find the time constant T of the decay and then the inductive limit itself. The decaying field is measured in a wide bandwidth (generally approximately 20 kHz) in order to measure the frequency elements of interest, from approximately 100 Hz to 20 kHz.

The time period in which the sine wave in the transmitter must be held high depends upon the conductivity of the metals present. The time must be sufficiently long enough for the eddy currents to have decayed sufficiently regarding the metal with the highest conductivity (approximately less than 5 milliseconds). The time of the transition must be fast enough in order for the transition signal to generate high frequency elements at sufficiently high frequencies, approximately 20 kHz.

The computer then adds or subtracts the inductive limit from the measurement taken at $f_h$. The inductive limit is added if the measurements of the decaying field are increasing with time and is subtracted if the measurements of the decaying field are decreasing with time.

This embodiment compensates for both conductive and ferrous metal distortion. It works if only conductive metals are present and it works if only ferrous metals are present. It also works if several conductive and several ferrous metals are present at the same time.

The transmission of an AC signal at $f_h$ may not be practical so two variations of the fifth embodiment are shown below, which allow for the transmission of an AC signal at a lower more "practical" frequency.

Figure 18:
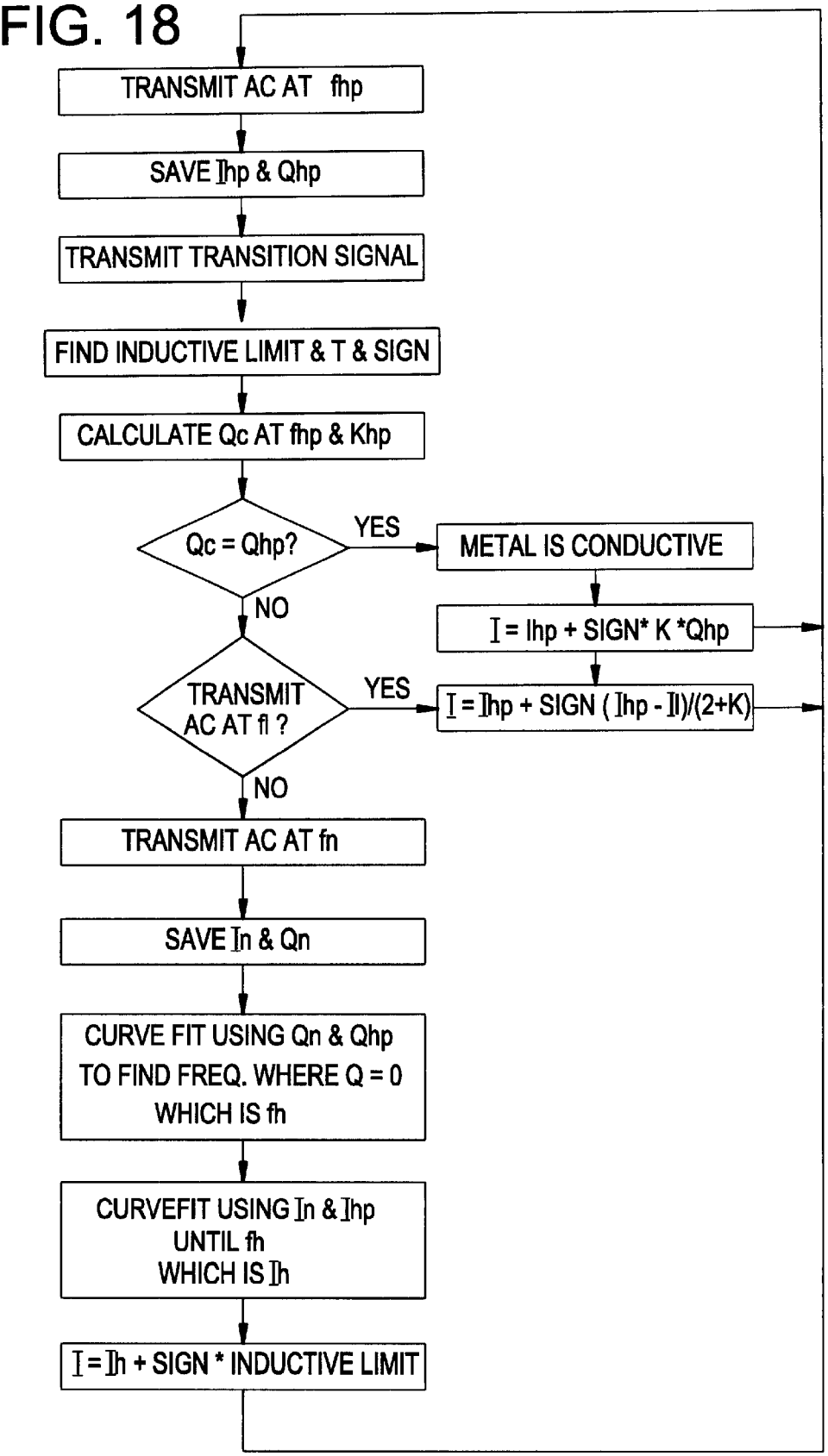
FIG. 18 shows the flowchart for a first variation of the fifth embodiment, employing the system illustrated in FIG. 20.

FIG. 18 shows the flowchart for the first variation of the fifth embodiment. This variation uses the magnetic field position and orientation system shown in FIG. 20. This system is capable of also measuring the signal in-quadrature to the transmitted magnetic field. This system measures at a "practical" frequency, $f_{hp}$, and the transition signal. The computer then calculates the expected in-quadrature signal $Q_c$ at $Q_{hp}$. If $Q_c=Q_{hp}$ then the metal is conductive and the signal free of metal distortion is found from $I=I_{hp}+(sign) K_Q*Q_{hp}$, where the sign is found from the transition signal and $K_Q$ from 1/T and the frequency.

If $Q_c$ is not equal to $Q_{hp}$, then two methods can be used: 1) An AC frequency at $f_1$ is used and the signal free of metal distortion is found from $I=I_{hp}+(sign)(I_{hp}-I_1)/(2+K_Q)$; or 2) Utilizing the transmission of a second AC frequency $f_n$ and curve fitting $Q_{hp}$ and $Q_n$ in order to find the frequency where Q=0. This frequency is $f_h$. The computer then makes a curve fitting using $I_{hp}$ and $I_n$ till $f_h$ in order to find $I_h$. The signal free of metal distortion can then be found from $I=I_h+(sign)$ inductive limit.

Figure 19:
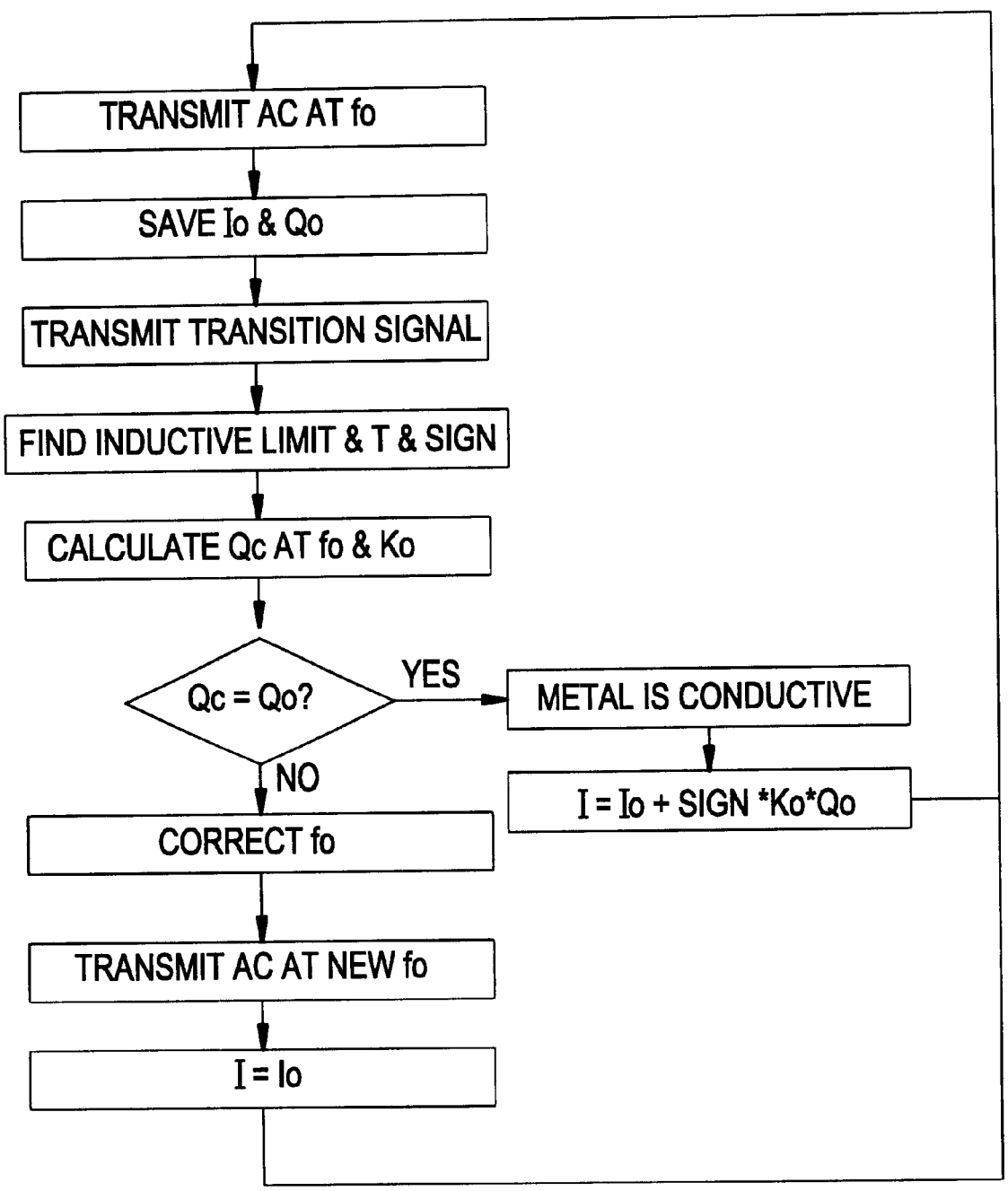
FIG. 19 shows the flowchart for a second variation of the fifth embodiment, employing the system illustrated in FIG. 20.

FIG. 19 shows the flowchart for the second variation of the fifth embodiment. This variation uses the magnetic field position and orientation system shown in FIG. 20. This system is capable of also measuring the signal in quadrature to the transmitted magnetic field. This variation transmits from a more "practical" AC frequency $f_0$ which is an estimate of the frequency where the metal in-phase signal $I_0$ is approximately equal to zero for the expected ferrous metals in the environment. The system further transmits the transition signal and finds the inductive limit, decay constant and sign. The computer then finds the calculated quadrature signal $Q_c$ expected at the frequency $f_0$ and k from the decay constant and the frequency. If $Q_c=Q_0$, then the metal is conductive and the signal free of metal distortion can be found from $I=I_0+(sign)K_Q*Q_0$. If $Q_c$ is not equal to $Q_0$, then the frequency $f_0$ is corrected using 1/T and knowledge of which ferrous metals may be present in the environment. Transmission is made at the corrected frequency $f_0$ and the signal free of metal distortion can be found from $I=I_0$.

Figure 20:
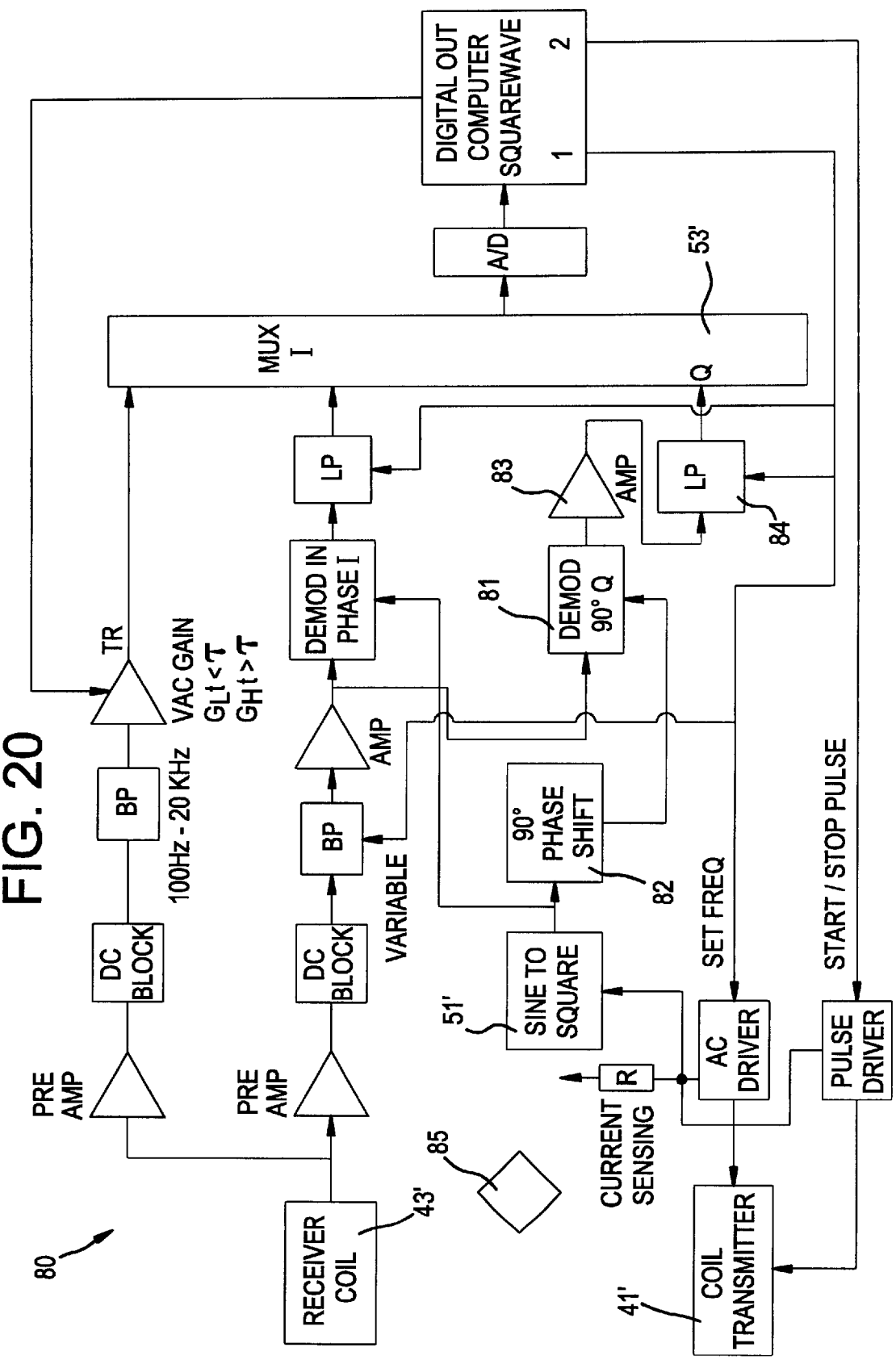
FIG. 20 shows a sixth embodiment of the present invention of an AC magnetic field position and orientation system with in-phase, in-quadrature, and transition capabilities.

FIG. 20 shows a sixth embodiment of the present invention in which a simple magnetic field position measurement system 80 uses only one transmitter and one receiver. The system 80 contains the entire system 70 shown in FIG. 17 with an additional demodulator 81 which enables the system to also measure in-quadrature (90 degrees out of phase) with the transmitted magnetic field. The demodulator is controlled from a 90 degree converter 82 which is fed from the sine to square converter 51'. The demodulator signal is fed into an amplifier 83 which is fed into a tracking low pass filter 84 which feeds into the multiplexer 53'. The transmitter transmits an AC magnetic field at at least two separate frequencies. The receiver is capable of measuring the time derivative of the magnetic field dB/dt. The transmitter transmits a sine wave so that the magnetic field is found from the received signal divided by $\omega$. The receiver can also be of any type that measures the magnetic field such as a Hall effect device, a Magnetoresistive device, a Coil followed by an integrator or any other type of sensor that can measure the magnetic field. A DC block is used in order to avoid measuring the DC magnetic field or the Earth's magnetic field. The system is capable of measuring the in-phase, I, and the in-quadrature, Q, with the transmitted magnetic field of the received magnetic field at these frequencies by utilizing a tracking bandpass filter and demodulators. The transmission frequencies are selected and set by the computer, which also controls the tracking filters in order to receive the transmitted frequency signals. A metallic object 85 is shown that will cause a metallic distortion of the magnetic field and therefore cause an error in the position determination of this system, if compensation is not carried out. The system is further capable of transmitting a pulse of magnetic field with a very fast transition time from its maximum value to zero. The system measures the received decaying magnetic field at different times.

The high frequency $f_h$ is chosen so that metallic distortion will act as an eddy current at the inductive limit, see FIGS. 8 and 14. An AC magnetic field is generated at the high frequency, $f_h$, and the received signal is stored in the memory.

The last part of the AC sine wave in the transmitter is then held at its maximum level for approximately 5 mSec. The level is then changed to zero through a very fast transition, approximately 50 $\mu$Sec. The system measures the received decaying magnetic field continually after the transition and first stops when the decaying signal is approximately 40% of the first read signal. It is then possible to find the magnetic field right after the transition has ended. This value is the inductive limit. See FIG. 9. If the time derivative dB/dt is measured, it is then possible to find the value right after the transition has ended. This is 1/T times the inductive limit. It is also possible to find the time constant T of the decay and then the inductive limit itself. The decaying field is measured in a wide bandwidth (generally approximately 20 kHz) in order to measure the frequency elements of interest, from approximately 100 Hz to 20 kHz.

The time period during which the sine wave in the transmitter must be held high depends upon the conductivity of the metals present. The time must be sufficiently long enough for the eddy currents to have decayed sufficiently for the metal with the highest conductivity (approximately less than 5 milliseconds). The time of the transition must be fast enough in order for the transition signal to generate high frequency elements at sufficiently high frequencies, approximately 20 kHz.

The computer then adds or subtracts the inductive limit from the measurement taken at $f_h$. The inductive limit is added if the measurements of the decaying field are increasing with time and is subtracted if the measurements of the decaying field are decreasing with time.

A second AC magnetic field is then transmitted at approximately $f_T=1/T$ and the in-quadrature received signal $Q_T$ is measured and stored in memory. The frequency $f_T$ is selected in order to be sure that sufficient signal will be present at that frequency, see FIG. 14.

The system then transmits the AC magnetic signal at $f_h$ and stores the received signal, $I_h$, in memory. The system then transmits the AC magnetic field at $f_T$ and stores the received signal $Q_T$ in memory.

Figure 21:
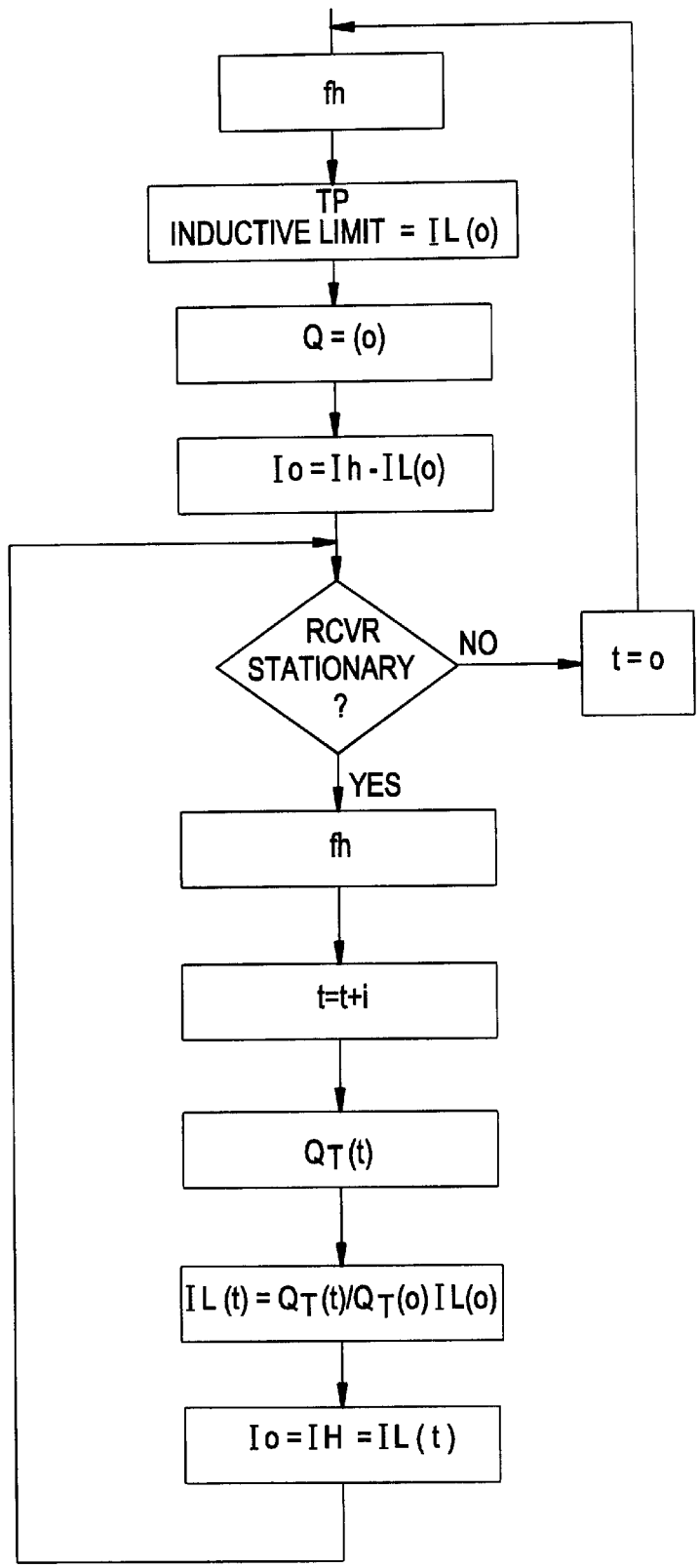
FIG. 21 shows the flowchart for the sixth embodiment.

The computer then finds the new inductive limit as $Q_T(t)/Q_T(0)$*Inductive limit(0) and compensates for the new inductive limit as above. The system then repeats from the transmission of the AC magnetic signal at two frequencies. This enables the system to only use pulse generation once at the start of system operation. The flowchart for the sixth embodiment is shown in FIG. 21.

This protocol works well so long as the same metals are present in the environment as was the case when the pulse was generated. If different metals are present at different times, the computer can be programmed to generate a pulse when the receiver is stationary and only utilizes the two AC frequencies when the receiver is moving. Any other schemes which allow for the measurement of the pulse transition from time to time and the utilization of only the two frequencies at all other times are possible.

The pulse response for different metals can be measured by a separate system and can be stored in a look-up table (not shown) in the current system. This will allow for a system that only utilizes two AC frequencies. The user must then input the metal characteristics to the computer prior to use of the system. The system will run faster if only the two AC frequencies are being used.

This embodiment compensates for both conductive and ferrous metal distortion. It works if only conductive metals are present and it works if only ferrous metals are present. It also works if several conductive and several ferrous metals are present at the same time.

The system 80 shown in FIG. 20 is used in a seventh embodiment using three frequency AC magnetic field transmission at $f_h$, $f_T*0.5$ and $f_T$ and one pulse transition point for compensation for conductive and ferrous metals.

The high frequency is chosen so that the metal distortion will act as an eddy current at the inductive limit, see FIGS. 8 and 14. An AC magnetic field is generated at the high frequency $f_h$ and the received signal is stored in the memory.

The last part of the AC sine wave in the transmitter is then held at its maximum level for approximately 5 mSec. The level is then changed to zero through a very fast transition, approximately 50 $\mu$Sec. The system measures the received decaying magnetic field continually after the transition and first stops when the decaying signal is approximately 40% of the first read signal. It is then possible to find the magnetic field right after the transition has ended. This value is the inductive limit. See FIG. 9. If the time derivative dB/dt is measured, it is then possible to find the value right after the transition has ended. This is 1/T times the inductive limit. It is also possible to find the time constant T of the decay and then the inductive limit itself. The decaying field is measured in a wide bandwidth (generally approximately 20 kHz) in order to measure the frequency elements of interest, from approximately 100 Hz to 20 kHz.

The time the sine wave in the transmitter must be held high depends upon the conductivity of the metals present. The time must be sufficiently long enough for the eddy currents to have decayed sufficiently for the metal with the highest conductivity (approximately less than 5 milliseconds). The time of the transition must be fast enough in order for the transition signal to generate high frequency elements at sufficiently high enough frequencies, approximately 20 kHz.

The computer then adds or subtracts the inductive limit from the measurement taken at $f_h$. The inductive limit is added if the measurements of the decaying field are increasing with time and is subtracted if the measurements of the decaying field are decreasing with time.

The system then transmits the AC magnetic signal at $f_h$ and stores the received signal, $I_h$, in memory. The system then transmits the AC magnetic field at $f_T$ and stores the received signal $Q_T$ in memory. The system then transmits the AC magnetic field at $f_T*0.5$ and stores the received signal $Q_{0.5T}$ in memory.

Figure 22:
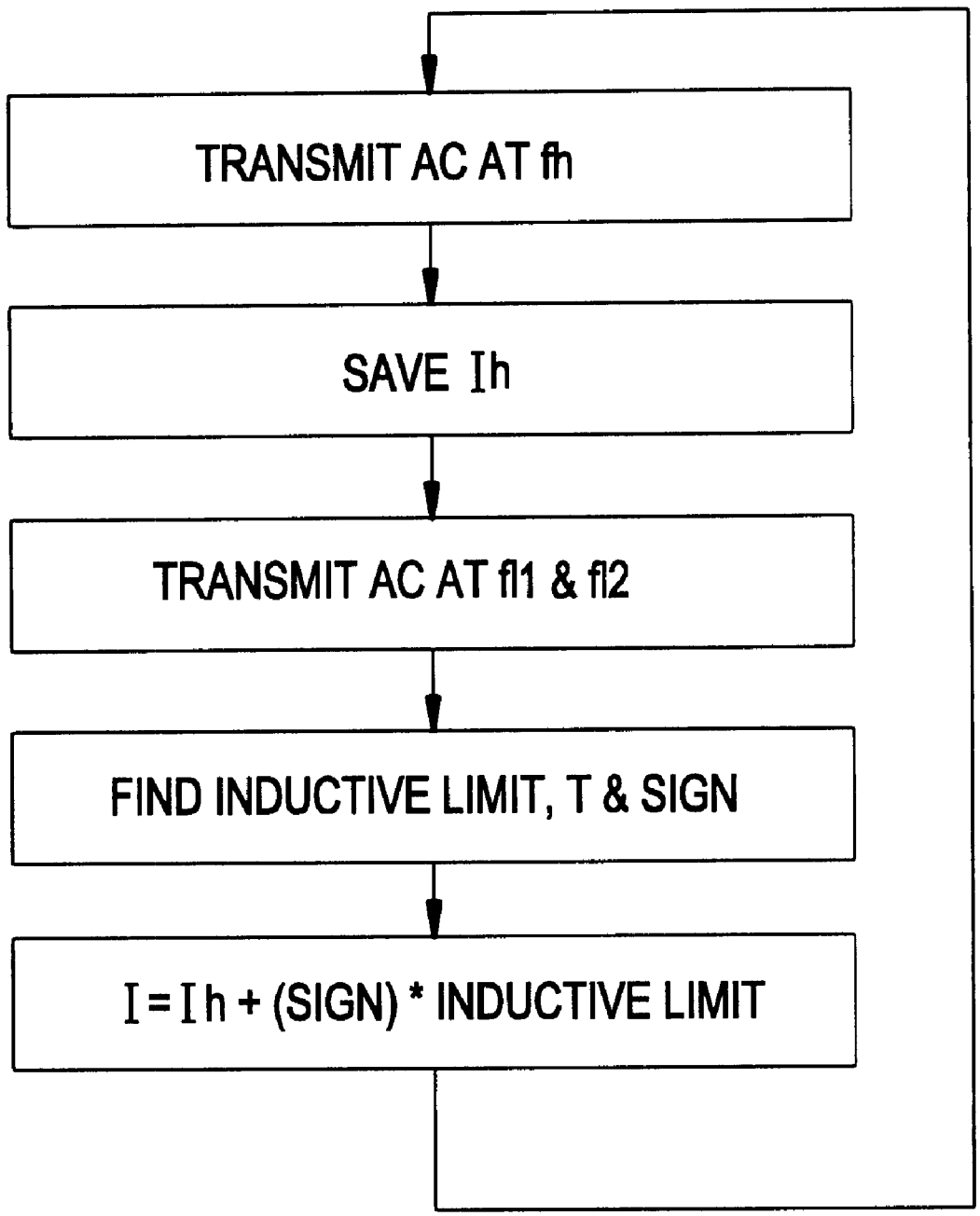
FIG. 22 shows the flowchart for a seventh embodiment which employs the system illustrated in FIG. 20.

If $Q_T(t)/Q_{0.5}T(t)=$ If $Q_T(0)/Q_{0.5}T(0)$, the computer then finds the new inductive limit as $Q_T(t)/Q_T(0)$*Inductive limit (0) and compensates for the new inductive limit as above. The system then repeats the transmission of the AC magnetic signal at two frequencies. If the quadrature ratios are not equal, the system repeats from the beginning with the generation of the pulse. This enables the system to use pulse generation only when necessary, i.e., whenever a new metal is introduced into the environment or when a metal is removed from the environment. The system will run faster if only the three AC frequencies are being used. The flowchart for the seventh embodiment is shown in FIG. 22.

This embodiment compensates for both conductive and ferrous metal distortion. It works if only conductive metals are present and it works if only ferrous metals are present. It also works if several conductive metals and several ferrous metals are present at the same time.

The system 60 shown in FIG. 16 is used in an eighth embodiment using three frequency AC magnetic field transmission at $f_h$, $f_{11}$ and $f_{12}$ and compensating for conductive and ferrous metals.

The high frequency is chosen so that the metal distortion will act as an eddy current at the inductive limit, see FIGS. 8 and 14. An AC magnetic field is generated at the high frequency $f_h$ and the received signal is stored in the memory.

Two low frequencies, $f_{11}$ and $f_{12}$ are chosen that will be in the area where the most common conductive metals will have measurable in-quadrature signals and no conductive metals have reached the inductive limit, FIGS. 13 and 14. Two equations with two unknowns (the inductive limit and the decay time constant T) can be created from the measurements:

$$Q_1 = kM_{01}*M_{12}/L*\alpha_1/(1+\alpha_1^2) \quad (16)$$

$$Q_2 = kM_{01}*M_{12}/L*\alpha_2/(1+\alpha_2^2) \quad (17)$$

Where $\alpha_1 = \omega_1*L/R$ and $\alpha_2 = \omega_2*L/R$.

These equations can be solved for the inductive limit and the decay time constant T.

It is then possible to find the signal free of metal distortion from:

$$I = I_h + \text{-the inductive limit} \quad (18)$$

Where the inductive limit is added if $I_{11} > I_{12}$ and subtracted if $I_{11} < I_{12}$. The flowchart for the eighth embodiment is shown in FIG. 22.

This works well if the relative permeabilities of the ferrous metals are sufficiently high enough so that the ferrous distortion is approximately constant for the frequencies $f_{11}$ and $f_{12}$, see FIG. 14.

This embodiment compensates for both conductive and ferrous metal distortion. It works if only conductive metals are present and it works if only ferrous metals are present. It also works if several conductive and several ferrous metals are present at the same time.

If it is not possible to measure at a frequency $f_h$ high enough for both the conductive and the ferrous metals in the environment to have reached their inductive limit, two variations of this embodiment can be used.

Figure 23:
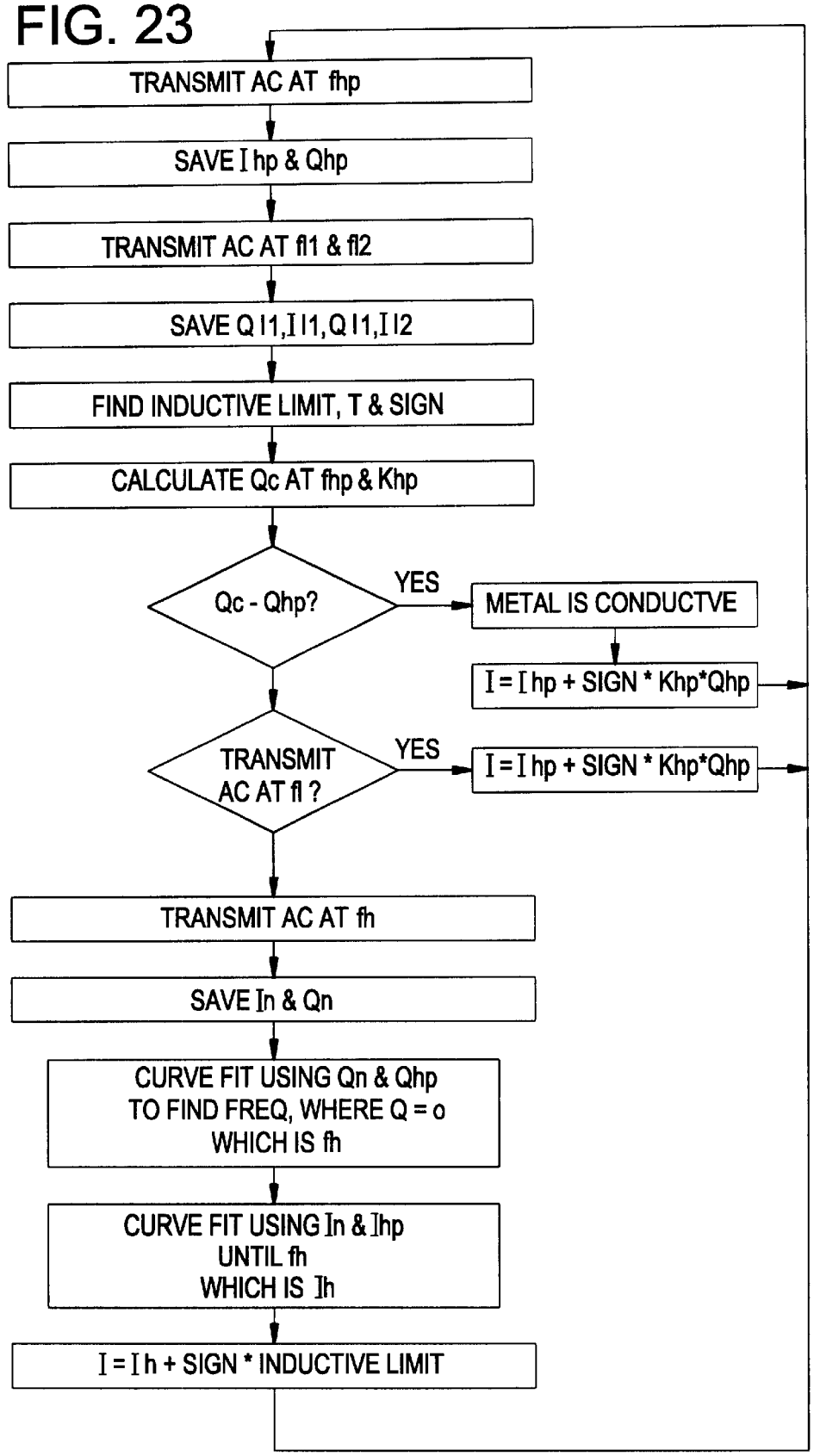
FIG. 23 shows the flowchart for the eighth embodiment which employs the system illustrated in FIG. 20.

FIG. 23 shows the flowchart for a first variation of the eighth embodiment. This variation uses the magnetic field position and orientation system shown in FIG. 16. This system is capable of also measuring the signal in-quadrature to the transmitted magnetic field. This system measures at a "practical" frequency $f_{hp}$ and at the two low frequencies $f_{11}$ and $f_{12}$ and finds the inductive limit, decay constant and sign. The computer then calculates the expected in-quadrature signal $Q_c$ at $Q_{hp}$. If $Q_c = Q_{hp}$, then the metal is conductive and the signal free of metal distortion is found from $I = I_{hp} + (\text{sign})K_Q*Q_{hp}$ where the sign is found from the transmission of the two low frequencies and $K_Q$ is determined from 1/T and the frequency.

If $Q_c$ is not equal to $Q_{hp}$, then two methods can be used: 1) An AC frequency at $f_1$ is used and the signal free of metal distortion is found from $I = I_{hp} + (\text{sign})(I_{hp} - I_1)/(2 + K_Q)$; or 2) Utilizing the transmission of a second AC frequency $f_n$ and curve fitting $Q_{hp}$ and $Q_n$ in order to find the frequency where $Q = 0$. This frequency is $f_h$. The computer then makes a curve fitting using $I_{hp}$ and $I_n$ till $f_h$ in order to find $I_h$. The signal free of metal distortion can then be found from $I = I_h + (\text{sign})$ inductive limit.

Figure 24:
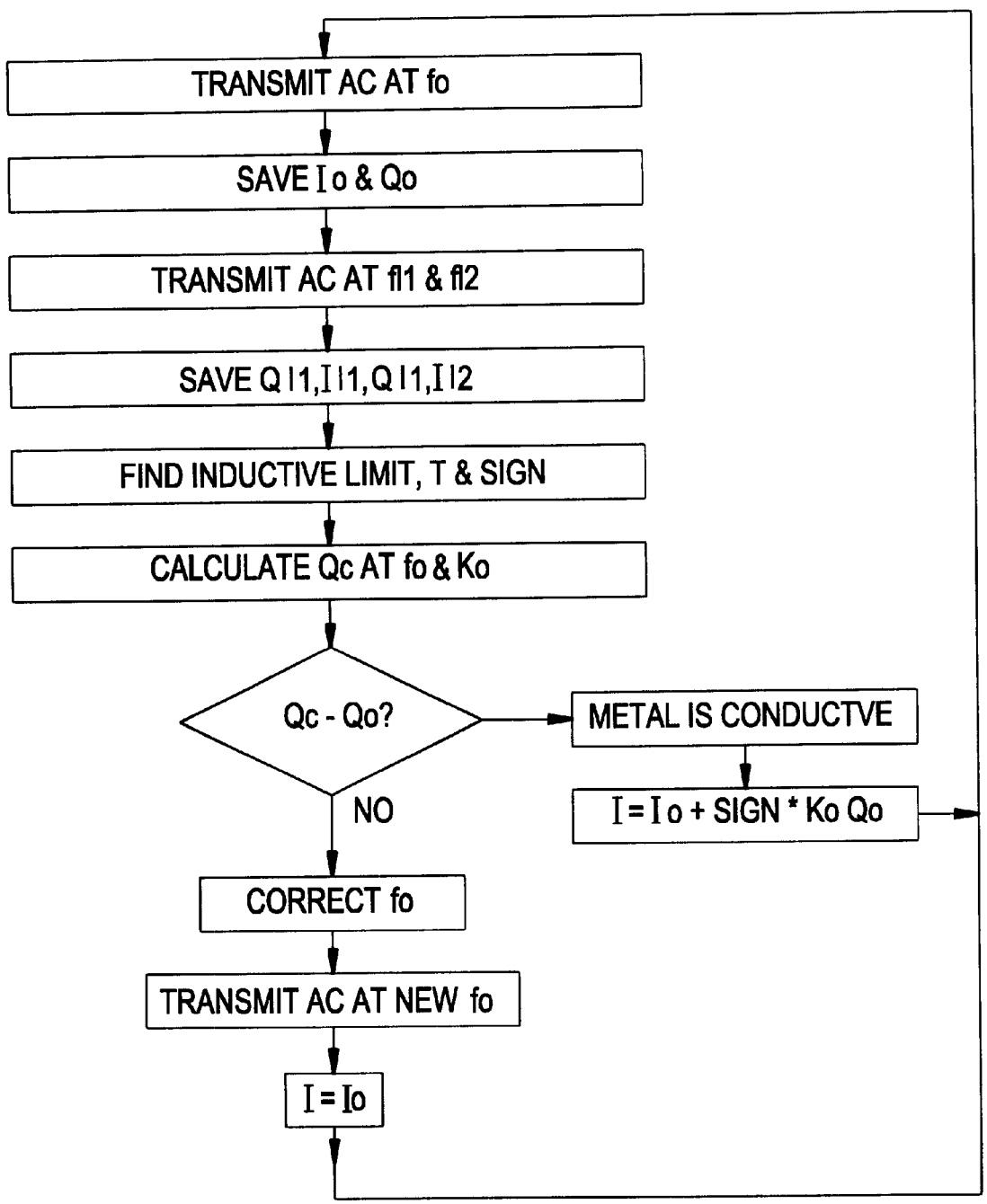
FIG. 24 shows the flowchart for a first variation to the eighth embodiment which employs the system illustrated in FIG. 20.
Figure 25:
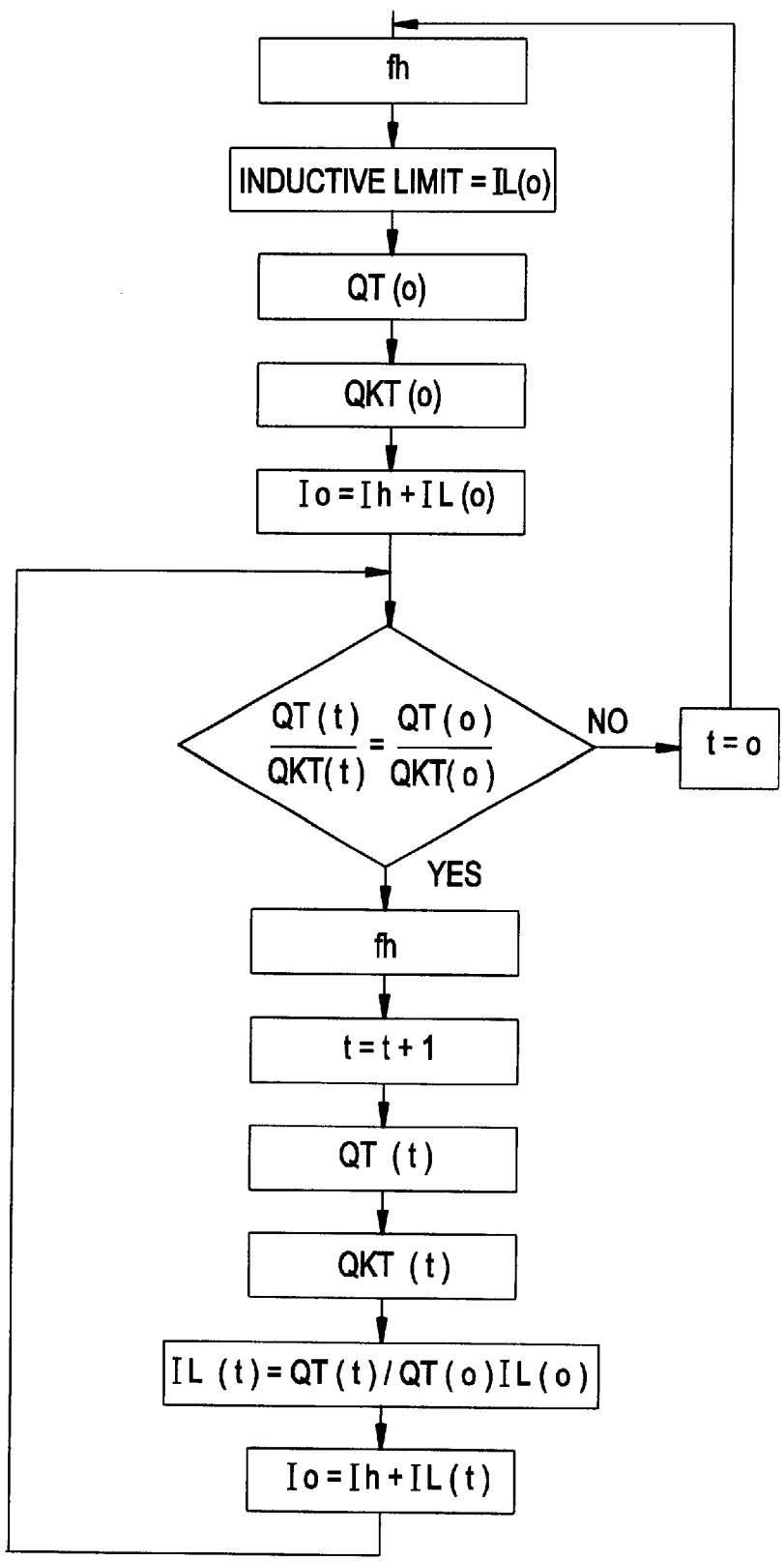
FIG. 25 shows the flowchart for a second variation to the eighth embodiment which employs the system illustrated in FIG. 20.

FIG. 24 shows the flowchart for the second variation of the eighth embodiment. This variation uses the magnetic field position and orientation system shown in FIG. 16. This system is capable of also measuring the signal in-quadrature to the transmitted magnetic field. This variation transmits from a more "practical" AC frequency $f_0$ which is an estimate of the frequency where the metal in-phase signal $I_0$ is approximately equal to zero for the expected ferrous metals in the environment. The system further transmits at the two low frequencies $f_{12}$, $f_{11}$ and finds the inductive limit, decay constant and sign. The computer then finds the calculated in-quadrature signal $Q_c$ expected at the frequency $f_0$ and $K_Q$ from the decay constant and the frequency. If $Q_c = Q_0$, then the metal is conductive and the signal free of metal distortion can be found from $I = I_0 + (\text{sign})K_Q*Q_0$.

If $Q_c$ is not equal to $Q_0$, the frequency $f_0$ is corrected using 1/T and knowledge of which ferrous metals may be present in the environment. Transmission is made at the corrected frequency $f_0$ and the signal free of metal distortion can be found from $I = I_0$.

The compensation schemes disclosed herein for conductive and ferrous metals can be utilized for any magnetic field position and orientation system measuring the position (x, y, z) and orientation (az, el, rl) in degrees of freedom from one to all six. Below, examples are shown using the fifth embodiment in position and orientation systems in five and six degrees of freedom. Any of the embodiments described above can be utilized in the position and orientation systems described below.

Some of the embodiments disclosed above utilize more than one frequency. Some of the embodiments utilize at least one frequency and a transition measurement. Measurement rate in a position and orientation measurement system is important. A scheme has therefore been developed in order to achieve a fast measurement rate even when different measurements must be made in order to compensate for distortion from metals. A transition measurement is treated the same as a frequency measurement in this scheme (f1 could be a transition measurement point, for example).

The scheme is explained for the use of three frequencies f1, f2, and f3. They can be cycled through f1,f2,f3,f1,f2,f3 so that after each new measurement, you have three measurements of the three frequencies f1, f2, f3, next f2,f3,f1, next f3, f1, f2, and if you have three frequencies at the same time f1 from x axis, f2 from y axis, and f3 from z axis, then next f2 from x, etc.

| x | f1 | f2 | f3 | f1 | f2 | f3 |
| y | f2 | f3 | f1 | f2 | f3 | f1 |
| z | f3 | f1 | f2 | f3 | f1 | f2 |
|   | M1 | M2 | M3 | M4 |    |    | so that after three measurements, you will have three frequencies on each axis after each next measurement. M1 utilizes the current measurements and the two prior measurements, M2 utilizes the current measurements and the two prior measurements, etc. This allows for a fast measurement rate.

Each measurement may be curve fitted into the same time, meaning as if they were taken at the same time in order to avoid "time skew". This is done by curve fitting for measurement M2 above, the signal received at frequency $f_1$ between the present measurement and the three prior measurements of $f_1$. The same is done for $f_2$ and for $f_3$. The measurements, as if they had been made at t2, are then found. The same scheme is utilized for the prior measurements in order to relate all three measurements necessary to the same time t2.

If only one frequency is used for all three axes at one time, the pattern is as follows:

| x | f1 | f2 | f3 | f1 | f2 | f3 |
| y | f1 | f2 | f3 | f1 | f2 | f3 |
| z | f1 | f2 | f3 | f1 | f2 | f3 |
| | M1 | M2 | M3 | M4 | | |

This shows the same pattern as above after the three first measurements you will have three frequencies on each axis after each measurement.

Each transmitter element must be compensated for due to the particular orientation(s) with respect to metallic objects. Each receiver element must be compensated due to orientation(s) with respect to metallic objects. For each transmitter axis, it may be possible to compensate the total field vector in order to determine range. Orientation may then be a problem.

Figure 26:
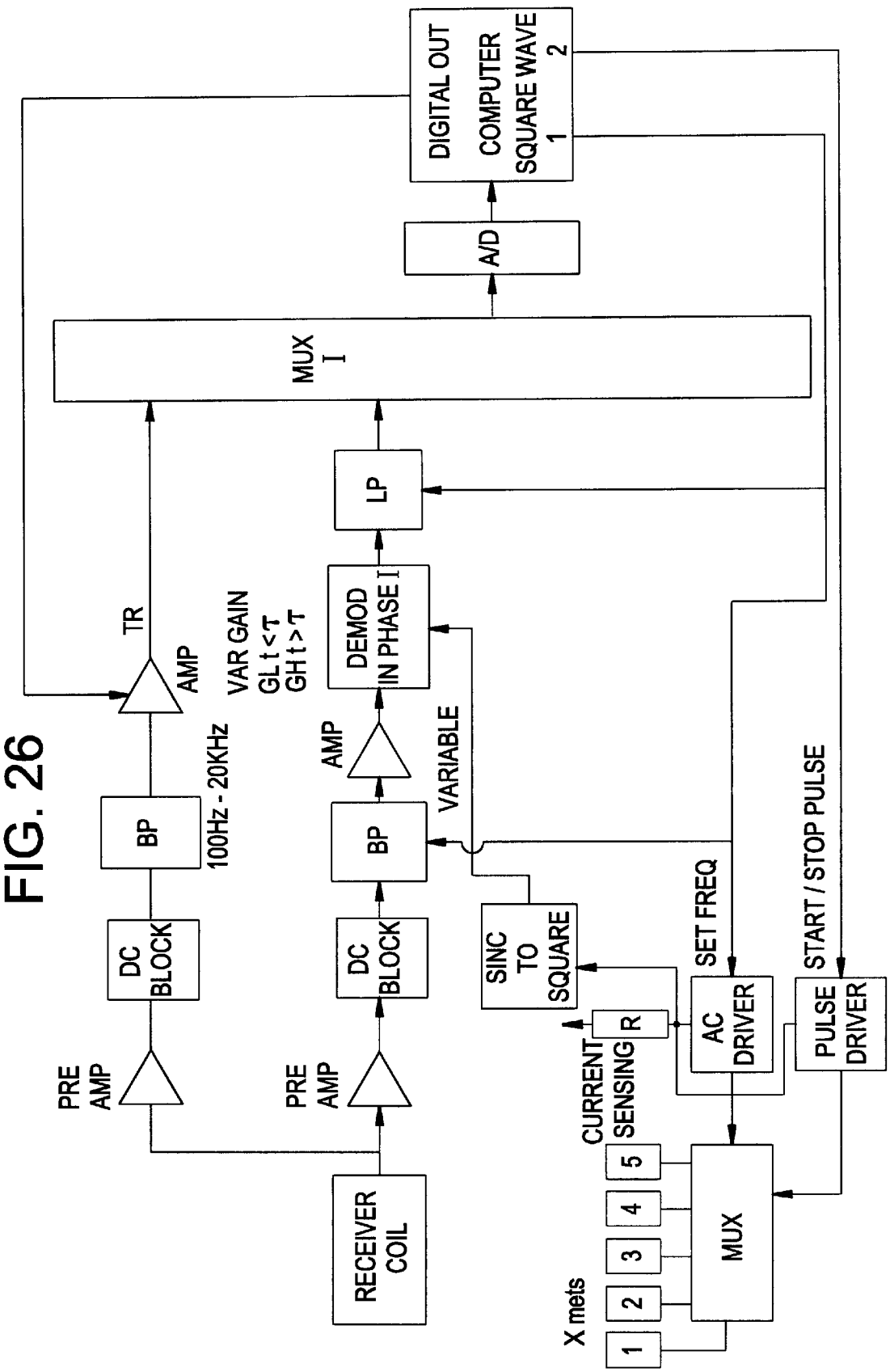
FIG. 26 shows a magnetic field position and orientation system in five degrees of freedom.

FIG. 26 shows a schematic diagram for a position and orientation system with five transmitters and one receiver which is capable of measuring the position and orientation in six dimensions, position (x, y, z) and orientation (az, el).

Figure 27:
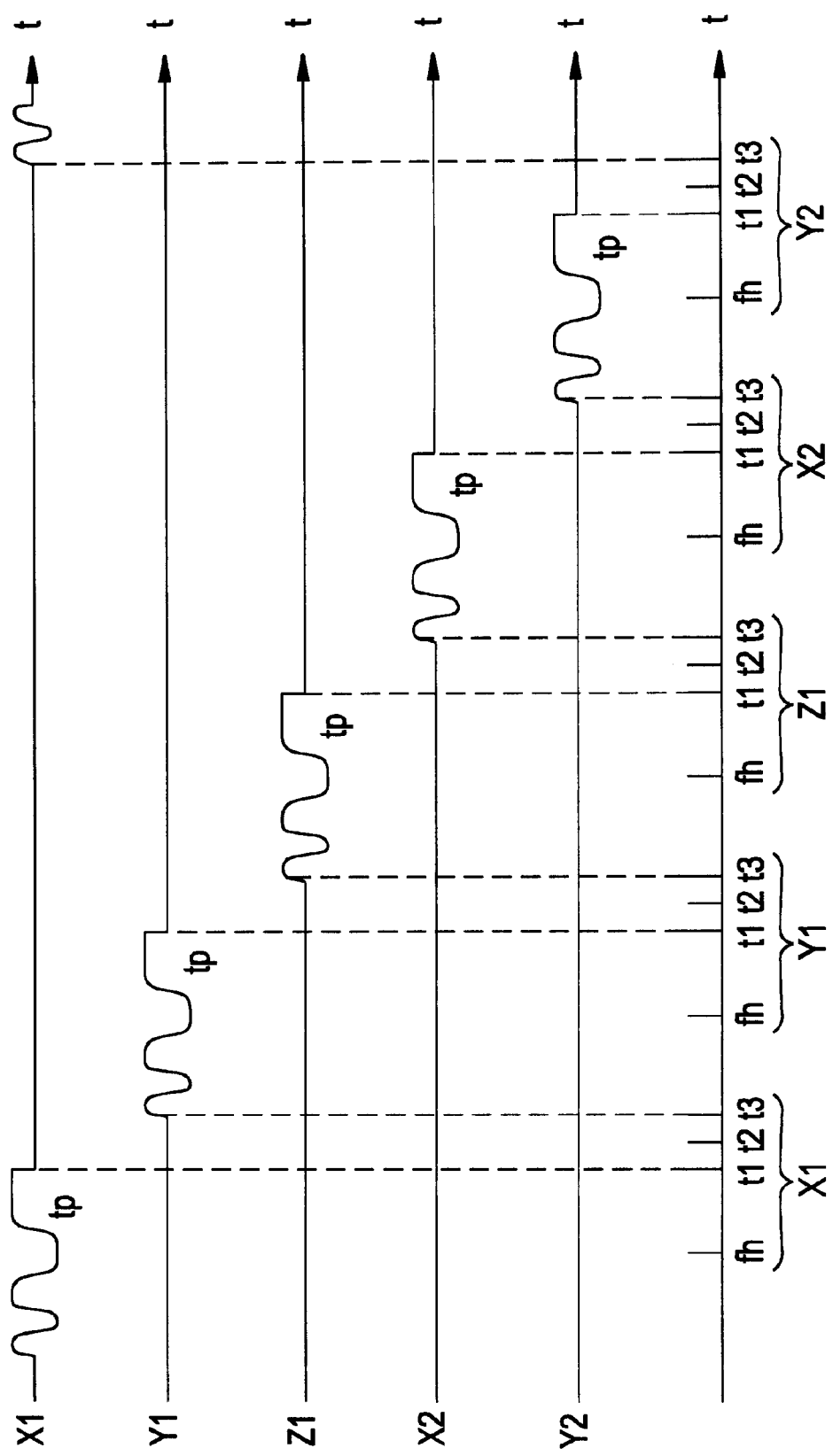
FIG. 27 shows an excitation scheme for the position and orientation system in five degrees of freedom.

FIG. 27 shows an excitation diagram for this system. The system measures a signal at the receiver for each of the five transmitters. Each signal is then compensated for metal distortion. It is then possible to make five equations with five unknowns, position (x, y, z) and orientation (az, el). These equations can be easily solved by a person skilled in the art using dipole fields for direct solutions or any type of iterative non-linear method as described in U.S. Pat. Nos. 4,314,251 and 4,054,881. The processing is all done in the system's microcomputer.

Figure 28:
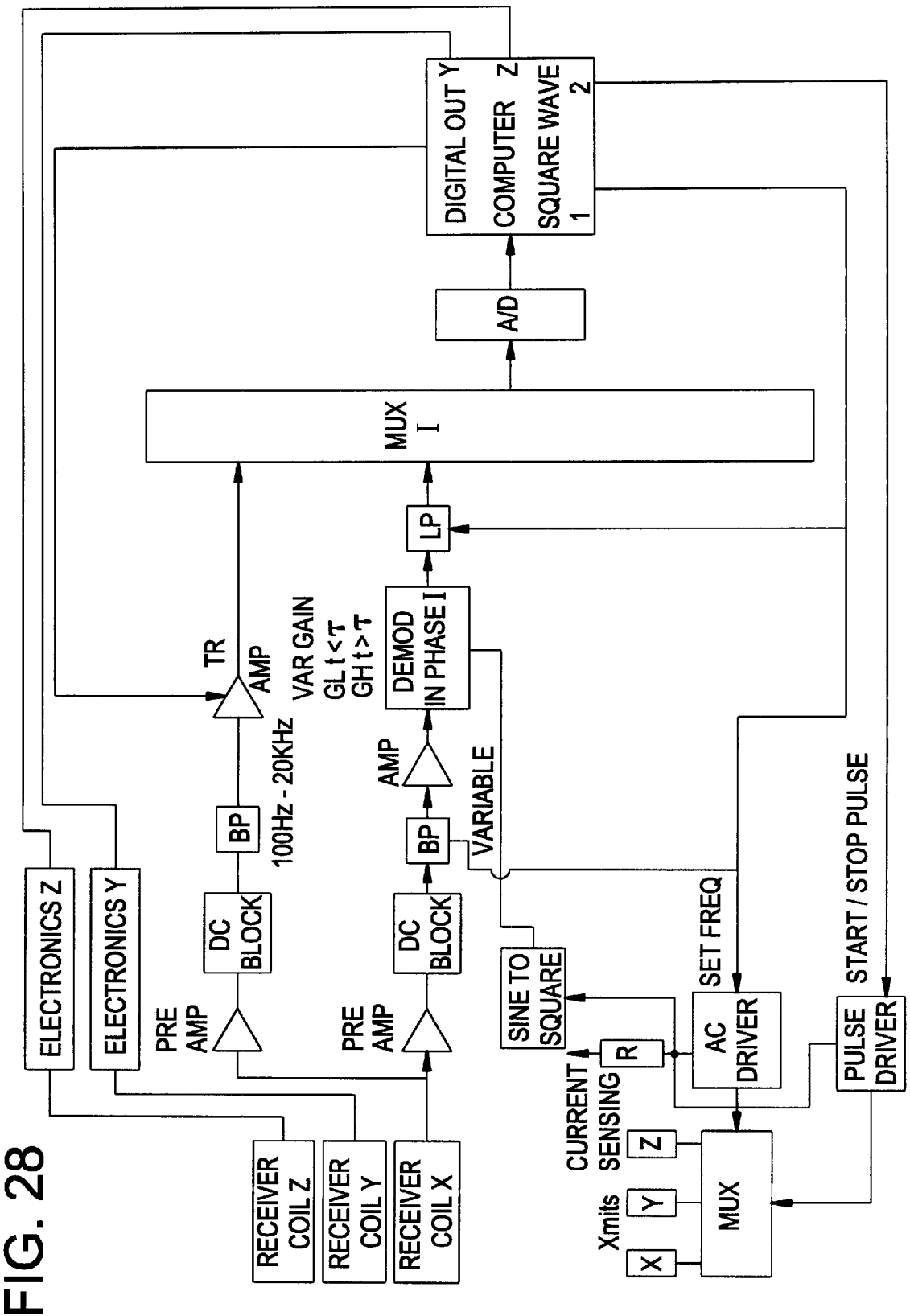
FIG. 28 shows a magnetic field position and orientation system in six degrees of freedom.

FIG. 28 shows a schematic diagram for a position and orientation system with three transmitters and three receivers which is capable of measuring the position and orientation in six dimensions, position (x, y, z) and orientation (az, el, rl).

Figure 29:
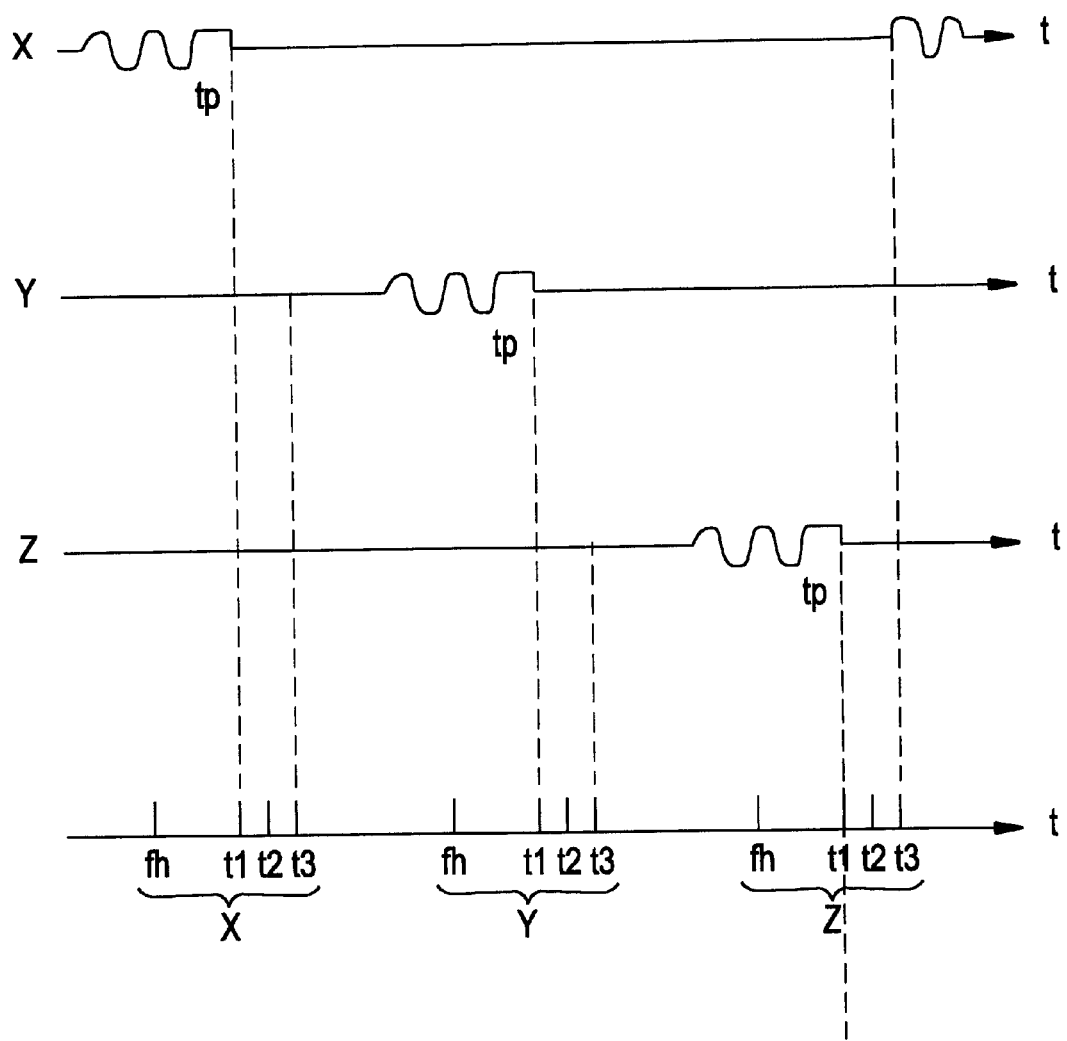
FIG. 29 shows an excitation scheme for the position and orientation system in six degrees of freedom.

FIG. 29 shows an excitation diagram for this system. The system measures a signal at each of the receivers for each of the three transmitters for a total of nine signals. Each signal is then compensated for metal distortion. It is then possible to make nine equations with six unknowns, position (x, y, z) and orientation (az, el, rl). These equations can be easily solved by a person skilled in the art using dipole fields for direct solutions or any type of iterative non-linear method as described in U.S. Pat. Nos. 4,314,251 and 4,054,881. The processing is all done in the system's microcomputer. It is possible to use only two transmitters and three receivers or three transmitters and two receivers in order to find the position and orientation in six degrees of freedom. It is then only possible to make six equations with six unknowns. These equations can be easily solved by a person skilled in the art using dipole fields for direct solutions or any type of iterative non-linear method as described in U.S. Pat. Nos. 4,314,251 and 4,054,881. The processing is all done in the system's microcomputer. The operation of multiple AC frequencies as necessary in some of the embodiments can be done sequentially or simultaneously. The schematics shown here are all made for sequential operation, using tracking bandpass and low pass filters. The compensation schemes shown here also work for simultaneous transmission of more AC frequencies. The receivers then must be capable of receiving more AC signals at the same time and separating the signals, which are accomplished by using multiple fixed bandpass and low pass filters each set for one specific transmission frequency.

The compensation schemes shown here yet further work with multiple types of metals present in the measurement environment.

More frequencies can be utilized in order to transmit at more signals in order to improve the various curve fittings.

Accordingly, an invention has been disclosed in terms of preferred embodiments that fulfill each and every one of the objects of the present invention as set forth above and provide a new and useful AC magnetic tracker with frequency-based compensation for metal distortion.

Of course, various changes, modifications and alterations in the teachings of the present invention may be contemplated by those skilled in the art without departing from the intended spirit and scope thereof.

As such, it is intended that the present invention only be limited by the terms of the appended claims.

What is claimed is:

1. A magnetic position and orientation measurement system for operation close to metallic objects comprising:
   a) at least one transmitter means for transmitting a non-DC-based magnetic field in a space;
   b) at least one receiver means in said space for receiving said magnetic field;
   c) computer means including compensation means for receiving said magnetic field and compensating for metal distortion directly from said received magnetic field without resort to mapping, said computer means being connected to said transmitter means and receiver means;
   d) said computer means further including means for computing position and orientation of said receiver means relative to said transmitter means from said received magnetic field free of metal distortion.

2. The system of claim 1, said compensation means further including:
   a) control means for transmitting said magnetic field at a frequency f, and for storing received signal strength; and
   b) said frequency f being chosen to be low enough to preclude creation of eddy current distortion of said magnetic field due to presence of conductive metal in or adjacent said space.

3. The system of claim 1, said compensation means further including:
   a) first control means for transmitting said magnetic field at a first frequency f1 and at a second frequency f2; and
   b) second control means for measuring signal strength received by said at least one receiver means in-phase and in-quadrature to said transmitted magnetic field at said frequency f1 and at said frequency f2; and
   c) processing means for calculating net signal strength of said received signal, free of ferrous as well as conductive metal distortion, from said in-phase and in-quadrature measurements.

4. The system of claim 3, wherein second processor means further calculates metals' inductive limit, decay time constant, and polarity sign; and
   a) said second processor means further calculates an expected difference between said in-phase signals; and
   b) said second processor means further finds the net signal strength free of metal distortion, if said calculated difference is equal to the actual measured difference, from said measured signals and said calculations.

5. The system of claim 1, said compensation means further including:
   a) processor means for selecting a frequency f0 at which said transmitter means is driven, said frequency f0 being chosen based upon knowledge of frequency ranges in which ferrous metals are likely to induce distortion; and b) control means for transmitting said magnetic field at said frequency f0, and for storing said received signals of ferrous metal distortion.

6. The system of claim 1, said compensation means further including:
a) first processor means for selecting transmission frequencies fh and fl, where fh is a relatively high frequency at which conductive and ferrous metals have reached their inductive limit, and fl is a relatively low frequency at which distortion of a magnetic field is quantifiable;
b) first control means for transmitting said magnetic field at said first frequency fh, and for storing a received field strength, Ih, in-phase with said transmitted magnetic field at frequency fh;
c) second control means for transmitting said magnetic field at said second frequency fl, and for storing a received field strength, Il, in-phase with said transmitted magnetic field at frequency fl;
d) second processor means for determining a ferrous metal distortion free received signal from said first and second received signals corresponding to said first and second magnetic fields, respectively.

7. The system of claim 1, said compensation means further including:
a) first processing means for selecting transmission frequencies fh and fl where fh is a relatively high frequency at which conductive and ferrous metals have reached their inductive limit, and fl is a relatively low frequency at which distortion of a magnetic field is approximately the same as found for DC; and
b) second control means for (1) controlling a last portion of a transmitted said magnetic field at the transmitter means at its maximum level for a desired time or (2) changing said magnetic field from any initial level to its maximum level during said desired time and then transitioning it from said maximum level to a zero level in a desired fall time; and
c) third control means for measuring received signal strength after said transitioning has occurred at least twice; and
d) second processing means for adding or subtracting a signal resulting from said transitioning to or from said received signal strength resulting in a net received signal strength free of distortion from conductive and/or ferrous metals.

8. The system of claim 7, said computer means further including third processor means to select frequency f such that an inductive limit for both the ferrous and the conductive metals has been reached.

9. The system of claim 7, further including:
a) fourth control means for transmitting an additional magnetic field at a frequency closely approximating 1/T; and
b) fifth control means for measuring received signal strength in-quadrature to said transmitted field at a frequency closely approximating 1/T, $Q_T$; and
c) third processing means for finding the new inductive limit from said received signal and said inductive limit and thus eliminating a need for generating a transition signal from time to time.

10. The system of claim 9, wherein said computer means includes sixth control means for allowing said receiver means to be held stationary, said transition signal only being used when said receiver means is stationary with relation to said transmitter means.

11. The system of claim 7, further including:
a) fourth control means for transmitting an AC magnetic field at a frequency close to 1/T and an AC magnetic field at a frequency defined by k1/T;
b) fifth control means for measuring received signal strength in-quadrature to said transmitted field at a frequency close to 1/T, Q1, and at a frequency defined by k1/T, Q2; and
c) third processing means for finding the new inductive limit from said received signals and said inductive limit and thus eliminating a need for generating a transition signal from time to time.

12. The system of claim 7, wherein said computer means includes means for refraining from using said transition signal when Q1(t)/Q2(t) at a current measurement is equal to Q1(t0)/Q2(t0) at a time said transition signal was used.

13. The system of claim 7, wherein said second processing means determines said transition compensation value from the formula Q1(t)/Q1(t0)*IT(t0).

14. The system of claim 7, further including:
a) fourth control means for receiving in-phase and in-quadrature signals relative to a transmitted magnetic field; and
b) means for storing in-phase and in-quadrature received signals.

15. The system of claim 1, said compensation means further including:
a) first control means for transmitting said magnetic field at a frequency f, and for storing received signal strength;
b) second control means for transmitting said magnetic field at a frequency f1 and at a frequency f2, both frequencies f1 and f2 being lower than said frequency f;
c) third control means for measuring received signal strength in-phase and in-quadrature with respect to said transmitted fields at frequency f1, and at frequency f2;
d) first processing means for finding inductive limit, decay time constant and polarity sign from said received signals collectively referred to as found parameters; and
e) second processing means for calculating net received signal strength, free of distortion from conductive and/or ferrous metals, from said received signals and said found parameters.

16. The system of claim 15, further including processor means for selecting the frequency f such that an inductive limit for both ferrous and conductive metals has been reached.

17. The system of any one of claims 2, 3, 5, 6, 7 or 15, wherein said computer means includes means for selecting appropriate transmission frequencies based upon knowledge of frequency response of various metals.

18. The system of any one of claims 2, 3, 5, 6, 7 or 15, wherein said computer means includes means for selecting appropriate transmission frequencies based on knowledge of properties of metals located in said space.

19. The system of any one of claims 2, 3, 5, 6, 7 or 15, wherein said at least one transmitter means comprises at least three transmitters, and said at least one receiver means comprises at least two receivers, said computer means including means for calculating position (x, y, z) and orientation (az, el, rl) in six degrees of freedom.

20. The system of any one of claims 2, 3, 5, 6, 7 or 15, wherein said at least one transmitter means comprises at least two transmitters, and wherein said receiver means comprises at least three receivers, and wherein said computer means calculates position (x, y, z) and orientation (az, el, rl) in six degrees of freedom.

21. The system of any one of claims 2, 3, 5, 6, 7 or 15, wherein said transmitter means comprises at least five transmitters, and wherein said computer means calculates position (x, y, z) and orientation (az, el) in five dimensions.

22. The system of any one of claims 2, 3, 5, 6, 7 or 15, wherein said at least one receiver means includes means for measuring dB/dt and wherein said computer means calculates magnetic field strength.

23. The system of any one of claims 2, 3, 5, 6, 7 or 15, further including further control means for rotating measurements at the different frequencies or transition measurements between the transmitter axis and further processor means in order to calculate the position and orientation using a present measurement and two most recent previous measurements.

24. The system of claim 23, said computer means further including further processor means for interpolating between measurements of a same frequency or transition measurement taken at different times but generated from a particular transmitter axis for determining all relevant measurements for a position and orientation measurement as if they were all taken simultaneously.

25. The system of any one of claims 15 or 14, further including:
   a) said magnetic field being transmitted at a high frequency $f_{hp}$ at which metals have not yet reached their inductive limit;
   b) said computer means including:
      i) third processing means for calculating expected quadrature signal $Q_c$ at frequency $f_{hp}$; and
      ii) fourth processing means for determining a signal free of metal distortion when measured quadrature signal is equal to a calculated said quadrature signal.

26. The system of claim 25, including further transmitting means for transmitting at a low frequency $f_1$ at which metal distortion is approximately the same as at DC.

27. The system of claim 25, including:
   a) further transmitting means for transmitting AC signals at a frequency $f_n$ different from $f_{hp}$;
   b) said computer means including:
      i) fifth processing means for utilizing curve fitting using quadrature signals to find a frequency $f_h$ where an in-quadrature signal is equal to zero;
      ii) sixth processing means using in-phase signals for finding in-phase signal $I_h$ at the frequency $f_h$; and
      iii) seventh processing means for finding a signal free of metal distortion from an in-phase signal at frequency $f_h$.

28. The system of any one of claims 15 or 14, wherein said transmission frequency f is chosen from knowledge of properties of metals, the computer means further including:
   a) second processing means for calculating an expected in-quadrature signal at a desired frequency f;
   b) third processing means for determining a signal that is free of metal distortion, when said measured in-quadrature signal is equal to said calculated in-quadrature signal, from said measured signals and said calculations; and
   c) fourth processing means for determining a signal that is free of metal distortion, when said measured in-quadrature signal is not equal to said calculated in-quadrature signal, from the measured in-phase signal.

29. The system of claim 28, wherein third processor means further includes means for utilizing curve fitting using said in-phase signals in order to find the expected in-phase signal at a sufficiently low frequency, and said third processor means further finding the net signal free of metal distortion from said calculated in-phase signal and said calculated parameter.

30. A method of measuring the position and orientation of an object for operation close to metallic objects including the steps of:
   a) providing a magnetic position and orientation system including:
      i) at least one single axis transmitter;
      ii) at least one single axis receiver attached to said object;
      iii) magnetic field transmission means;
      iv) magnetic field receiving means;
      v) computer means for controlling said transmitter and receiver means;
   b) programming said computer means to transmit a non-DC-based magnetic field at a selected frequency;
   c) further programming said computer means to store received signals;
   d) further programming said computer means to calculate metal distortion from said received signals without resort to mapping;
   e) further programming said computer means to find said received signals free of metal distortion; and
   f) further programming said computer means to calculate position and orientation of said object from said metal distortion free signals.

31. The method of claim 30, wherein said programming step includes the step of selecting the selected frequency low enough for conductive metals to be approximately equal to the magnetic field at DC.

32. The method of claim 31, wherein said selecting step includes the step of choosing two frequencies, both low enough so that an inductive limit for said objects has not been reached.

33. The method of claim 32, further including additional means for measuring both in-phase and in-quadrature signals, and further including the steps of:
   a) further programming the computer means to calculate inductive limit, decay time constant and polarity sign from said in-quadrature signals;
   b) further programming the computer means to calculate expected difference between two in-phase signals;
   c) further programming the computer means to find a signal free of metal distortion from said signals and said calculations if the expected difference is equal to the measured difference;
   d) further programming the computer means to use curve fitting of said two in-phase signals in order to find the in-phase signal at a sufficiently low frequency if the expected difference is not equal to the measured difference; and
   e) further programming the computer means to find a signal free of metal distortion from said signals and said calculations.

34. The method of claim 30, wherein said selecting step includes the step of choosing a frequency at which in-phase signal of ferrous metal distortion is approximately equal to zero.

35. The method of claim 30, further including the step of holding the magnetic field at its maximum level for a desired time period and then shifting to zero very fast.

36. The method of any one of claims 32 or 35, with additional means for measuring both in-phase and in-quadrature signals, and:
   a) further programming the computer means to calculate inductive limit, decay time constant and polarity sign from two in-quadrature signals;
   b) further programming the computer means to transmit at an additional frequency;
   c) further programming the computer means to calculate an expected in-quadrature signal at the additional frequency;
   d) further programming the computer means to calculate the signal free of metal distortion from said signals and calculations if said expected in-quadrature signal is equal to a measured in-quadrature signal;
   e) further programming the computer means to transmit at yet one more additional frequency and using curve fitting on said in-quadrature signals in order to find a frequency where the in-quadrature signal is equal to zero if said expected in-quadrature signal is not equal to said measured in-quadrature signal;
   f) further programming the computer means to utilize the found frequency from sub-paragraph e) above, and curve fitting on in-phase signals in order to find an in-phase signal at said frequency; and
   g) further programming the computer means to calculate a signal free of metal distortion from said signals and said calculations.

37. The method of any one of claims 32 or 35, with additional means for measuring both in-phase and in-quadrature signals, and:
   a) further programming the computer means to calculate inductive limit, decay time constant and polarity sign from two in-quadrature signals;
   b) further programming the computer means to transmit at an additional AC frequency where ferrous metal distortion in-phase signal is approximately equal to zero;
   c) further programming the computer means to calculate expected in-quadrature signal at the additional frequency;
   d) further programming the computer means to calculate a signal free of metal distortion from said signals and calculations if said expected in-quadrature signal is equal to said measured in-quadrature signal; and
   e) further programming the computer means to calculate a signal free of metal distortion from said signals and said calculations if said expected in-quadrature signal is not equal to said measured in-quadrature signal.

* * * * *